(12) United States Patent (10) Patent No.: US 8,289,434 B2
Murase (45) Date of Patent: Oct. 16, 2012

(54) IMAGE PROCESSING APPARATUS, CONTROL METHOD, AND STORAGE MEDIUM FOR EDITING LAYOUT POSITIONS OF IMAGE DATA

(75) Inventor: Takeshi Murase, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 12/557,772

(22) Filed: Sep. 11, 2009

(65) Prior Publication Data

US 2010/0073488 A1 Mar. 25, 2010

(30) Foreign Application Priority Data

Sep. 25, 2008 (JP) ................................ 2008-246601

(51) Int. Cl.
*H04N 5/222* (2006.01)
(52) U.S. Cl. ................... 348/333.05; 348/222.1
(58) Field of Classification Search ........... 348/333.01–333.12, 222.01, 207.99; 715/243–253, 790, 793, 815; 382/284, 291, 382/293, 294, 298, 313
See application file for complete search history.

(56) References Cited

U.S. PATENT DOCUMENTS

| | | | |
|---|---|---|---|
| 7,231,144 B2 | 6/2007 | Tanaka et al. | |
| 2005/0001933 A1* | 1/2005 | Yoshikawa et al. | 348/564 |
| 2005/0140813 A1* | 6/2005 | Wani | 348/333.12 |
| 2006/0204044 A1 | 9/2006 | Takemoto et al. | |
| 2006/0213386 A1 | 9/2006 | Funakura | |

FOREIGN PATENT DOCUMENTS

| | | |
|---|---|---|
| JP | 2004-362403 | 12/2004 |
| JP | 2005-100338 | 4/2005 |
| JP | 2006-277729 | 10/2006 |
| JP | 2006-304265 | 11/2006 |

OTHER PUBLICATIONS

English translation of Japanese Patent Laid-Open No. 2004-362403, (Dec. 24, 2004).

* cited by examiner

*Primary Examiner* — Nelson D. Hernández Hernández
(74) *Attorney, Agent, or Firm* — Fitzpatrick, Cella, Harper & Scinto

(57) ABSTRACT

The present invention provides an image processing apparatus including a unit that obtains a plurality of image data, a unit that designates an image group as an editing target in the plurality of image data, a unit that determines a main object in each image data of the image group, a unit that obtains, from the image data, information to determine a depth-direction relative positional relationship between the main object and an image capturing apparatus, the information containing information of the main object, a unit that determines, based on the information, the depth-direction relative positional relationship between the image capturing apparatus and the main object in each image data of the image group, and a unit that determines, based on the positional relationship, a layout order and image sizes or an image overlay order of the image data of the image group on a layout plane.

11 Claims, 16 Drawing Sheets

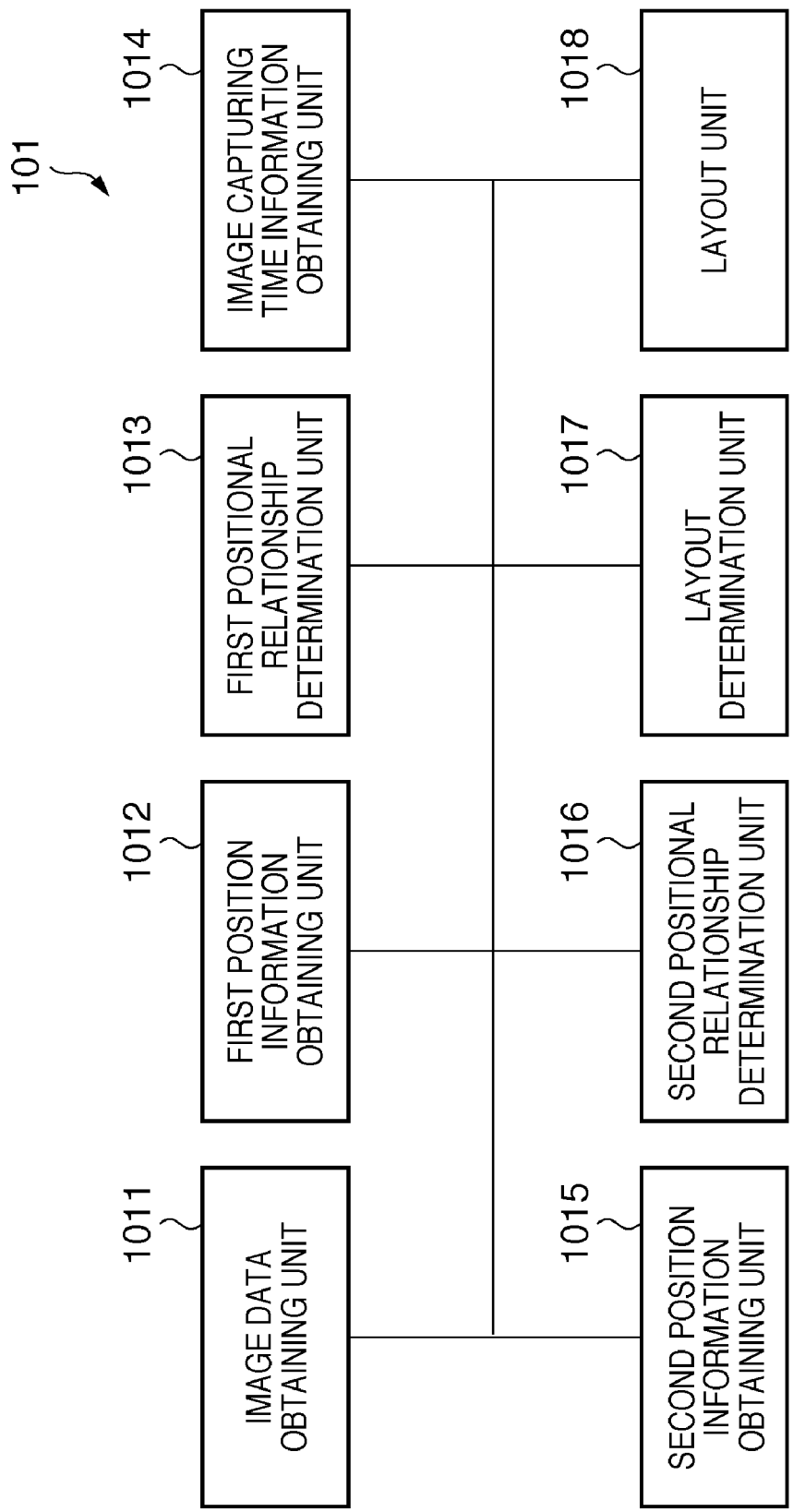

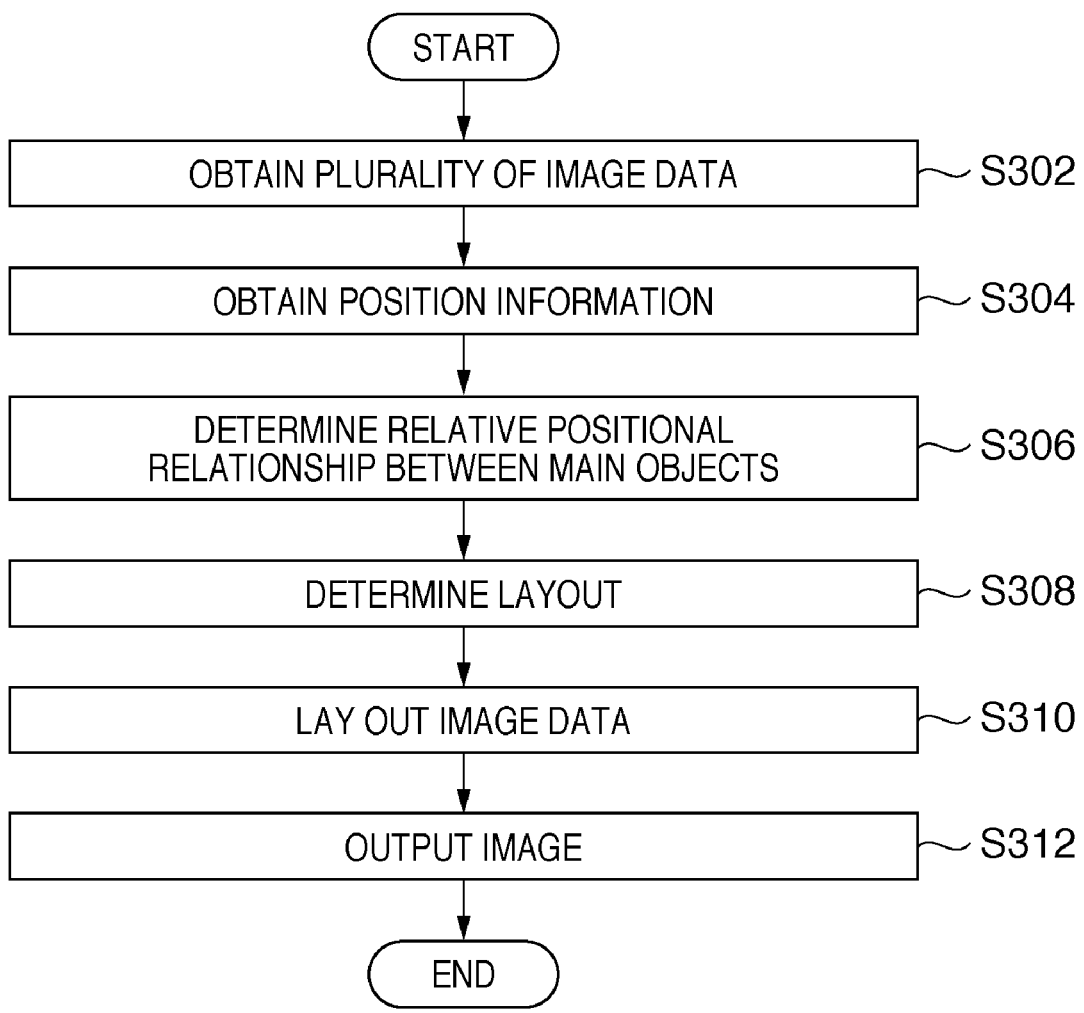

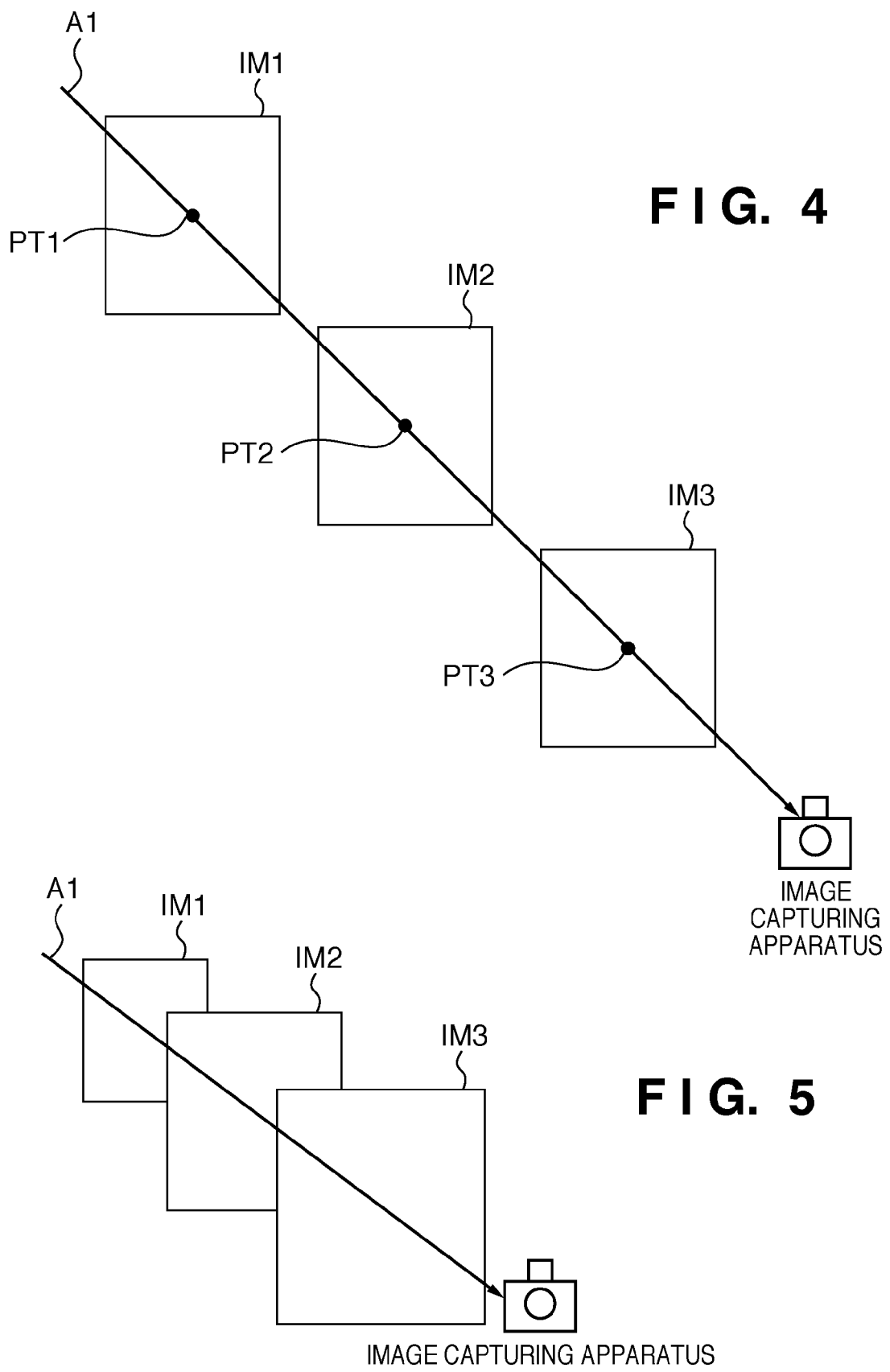

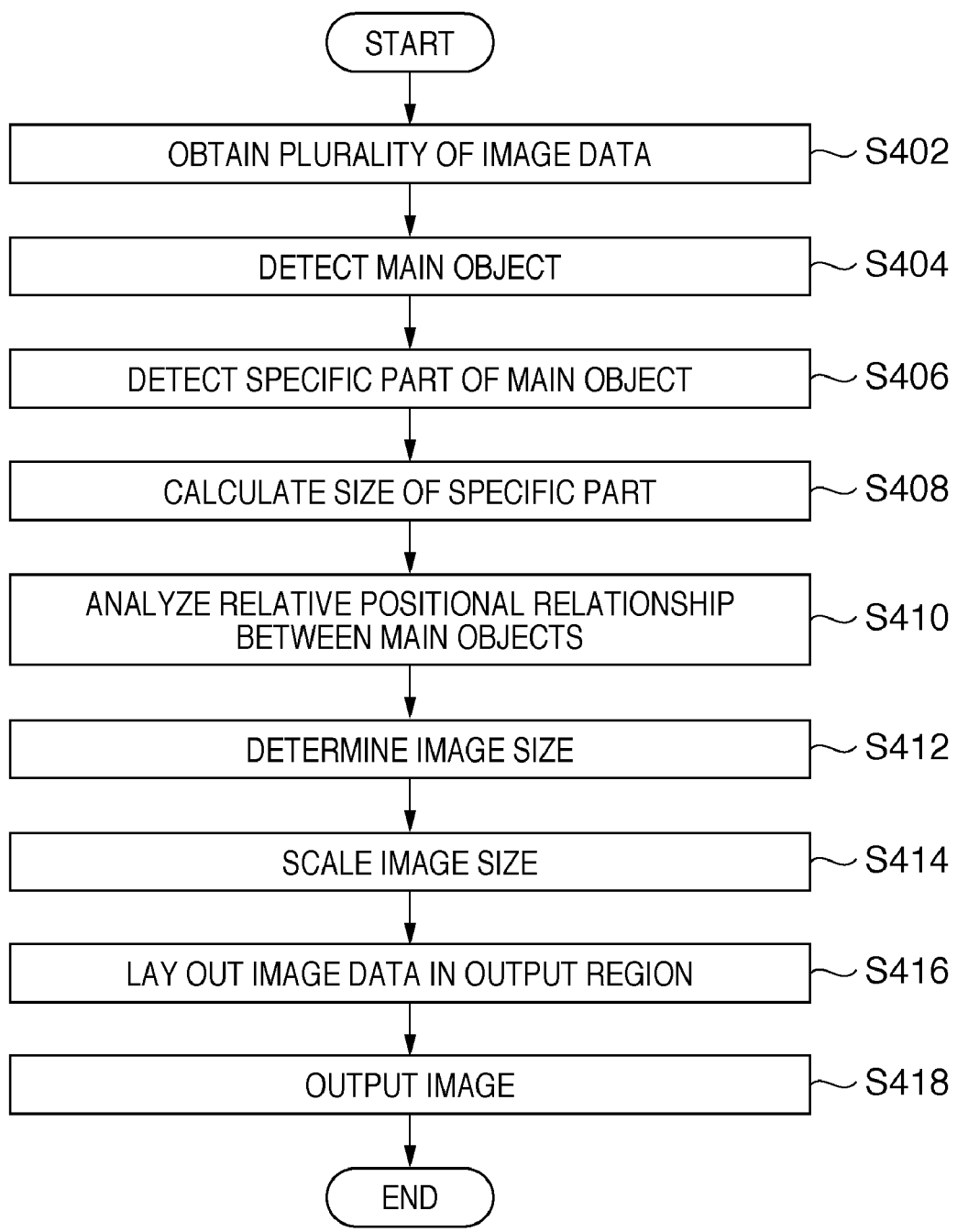

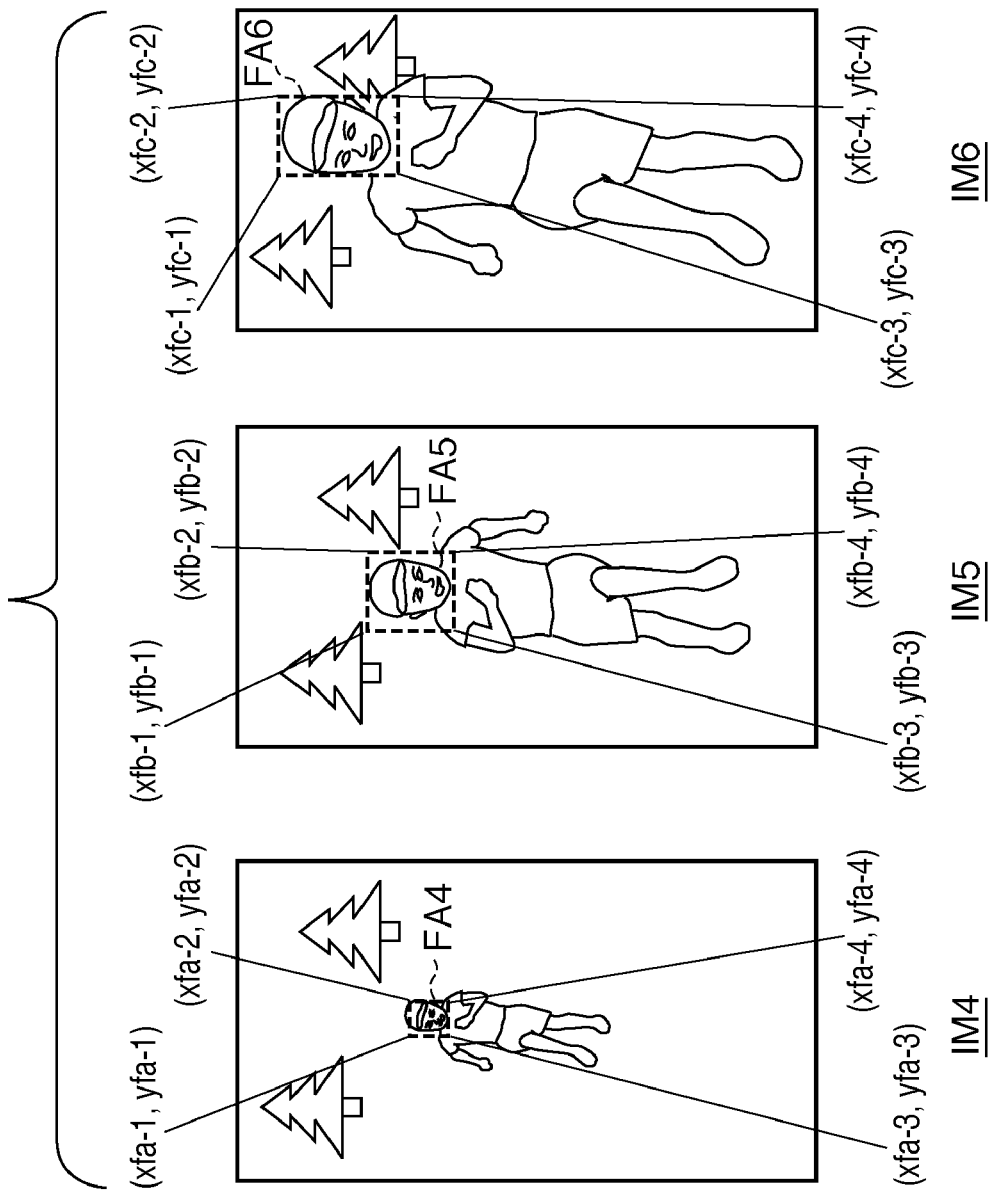

F I G. 13
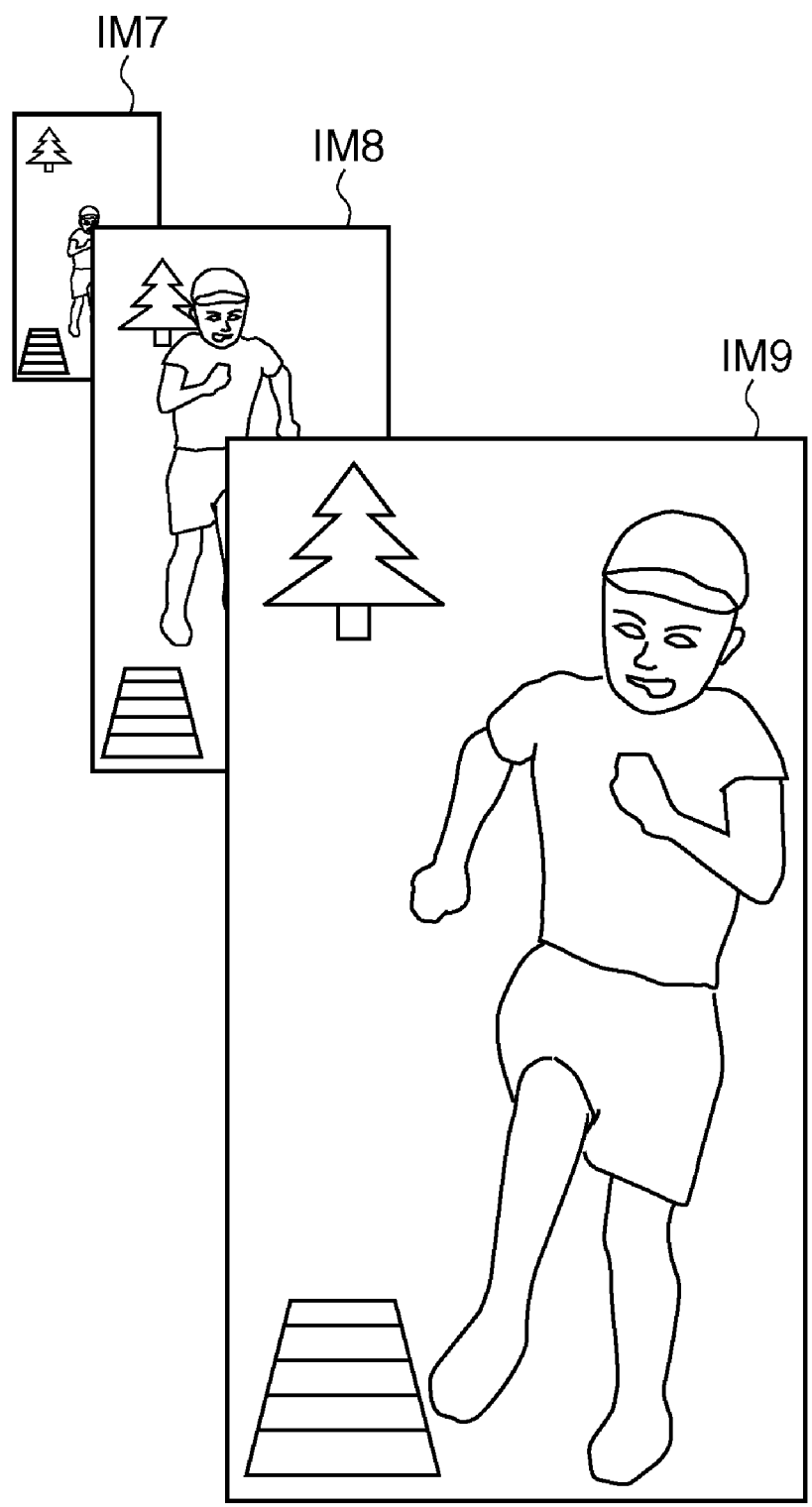

IMAGE PROCESSING APPARATUS, CONTROL METHOD, AND STORAGE MEDIUM FOR EDITING LAYOUT POSITIONS OF IMAGE DATA

BACKGROUND OF THE INVENTION

1. Field of the Invention

The present invention relates to an image processing apparatus, a control method, and a storage medium.

2. Description of the Related Art

A conventional image processing apparatus obtains a plurality of images (image data) captured by an image capturing apparatus such as a digital still camera or a digital video camera and pastes the plurality of images in an output region such as a monitor (display screen) or a pasteboard, thereby creating a digital album.

In the digital album creation, each of the plurality of images is automatically laid out at a predetermined position of the output region. In this case, the images are laid out in the output region independently of their contents (i.e., without considering the showing of the image layout). This may make a user (appreciator) have a sense of incongruity in the image layout.

The user may lay out the images in the output region while taking the showing of the image layout into consideration. However, if there is an enormous number of images, selecting images based on the contents and determining their layout positions in the output region is extremely laborious and time-consuming.

Several image processing apparatuses have been proposed to create a digital album in consideration of the showing of image layout.

Japanese Patent Laid-Open No. 2006-277729 discloses a technique which extracts a frame image from a moving image, detects the transverse moving direction of a main object based on the change of the positional relationship between the main object and a background object, and determines trimming and a layout in an output region in accordance with the moving direction.

Japanese Patent Laid-Open No. 2006-304265 discloses a technique which calculates the direction components of an image and determines a layout in an output region based on the direction components.

Japanese Patent Laid-Open No. 2005-100338 discloses a technique of determining a layout in an output region based on the information of time when an image has been captured.

Japanese Patent Laid-Open No. 2006-277729 detects the moving direction of the main object based on the relative positional relationship between the main object and a background object. In this case, it is difficult to obtain the main object moving direction in the depth direction of the main object and the image capturing apparatus. In Japanese Patent Laid-Open No. 2006-277729, it is therefore impossible to determine an ideal layout in accordance with the depth-direction relative positional relationship between the main object and the image capturing apparatus. Note that the ideal layout is a layout that expresses the relative positional relationship between the main object and the image capturing apparatus. More specifically, in the ideal layout, an image having a closer relative positional relationship between the main object and the image capturing apparatus is displayed in a larger size. Alternatively, when overlaying a plurality of images, an image having a closer relative positional relationship between the main object and the image capturing apparatus is displayed on the near side.

Japanese Patent Laid-Open No. 2006-304265 calculates the direction components of an object in an image using, for example, the object's edge information obtained by spatial frequency analysis. In this case, it is difficult to obtain the main object moving direction in the depth direction of the main object and the image capturing apparatus. In Japanese Patent Laid-Open No. 2006-304265, it is therefore impossible to determine an ideal layout in accordance with the depth-direction relative positional relationship between the main object and the image capturing apparatus, as in the Japanese Patent Laid-Open No. 2006-277729.

Japanese Patent Laid-Open No. 2005-100338 can realize a layout that expresses the passage of time. However, the user may feel incongruity because the relative positional relationship between the main object and the image capturing apparatus is not taken into consideration. For example, a plurality of images obtained by capturing the movement of the main object that comes closer to the image capturing apparatus and a plurality of images obtained by capturing the movement of the main object that moves away from the image capturing apparatus are arranged in the same time-base layout. In this case, an image having a farther relative positional relationship between the main object and the image capturing apparatus may be displayed in a large size. Alternatively, when overlaying a plurality of images, an image having a farther relative positional relationship between the main object and the image capturing apparatus may be displayed on the near side. This produces incongruous feeling for the user.

Japanese Patent Laid-Open No. 2004-362403 discloses a technique of determining the ratio of image overlay regions in a layout using focal length information held in the header information of image data obtained by a digital still camera. However, image data generated by converting a photo taken by a silver halide camera into digital data using a scanner or the like has no header information. For this reason, the prior art cannot realize a layout considering the perspective and depth feel.

SUMMARY OF THE INVENTION

The present invention provides a technique capable of determining a layout that expresses the relative positional relationship between an image capturing apparatus and a main object when laying out a plurality of image data (images) in an output region.

According to one aspect of the present invention, there is provided an image processing apparatus for editing layout positions of a plurality of image data and laying out the plurality of image data on a two-dimensional layout plane, including an image data obtaining unit configured to obtain the plurality of image data, a designation unit configured to designate an image group as an editing target in the plurality of image data obtained by the image data obtaining unit, a determination unit configured to determine a main object in each image data of the image group, a first information obtaining unit configured to obtain, from the image data, information to determine a depth-direction relative positional relationship between the main object and an image capturing apparatus, the information containing information of the main object, a first positional relationship determination unit configured to determine, based on the information obtained by the first information obtaining unit, the depth-direction relative positional relationship between the image capturing apparatus and the main object in each image data of the image group, and a layout determination unit configured to determine, based on the positional relationship determined by the first positional relationship determination unit, a layout order and image sizes or an image overlay order of the image data of the image group on the layout plane and lay out the image data of the image group on the layout plane.

Further features of the present invention will become apparent from the following description of exemplary embodiments with reference to the attached drawings.

BRIEF DESCRIPTION OF THE DRAWINGS

FIG. 2 is a block diagram showing a functional arrangement implemented by the CPU of the image processing apparatus shown in FIG. 1.

FIG. 3 is a flowchart for explaining layout processing by the image processing apparatus shown in FIG. 1.

FIG. 4 is a view showing the depth-direction relative positional relationship between an image capturing apparatus and main objects included in images corresponding to a plurality of image data.

FIG. 5 is a view showing an example of an ideal image layout determined based on the depth-direction relative positional relationship between the main object and the image capturing apparatus.

FIG. 6 is a flowchart for explaining layout processing according to the first embodiment.

FIG. 7 is a view showing examples of images corresponding to a plurality of image data obtained in step S402 of FIG. 6.

FIG. 13 is a view showing an example in which three images are laid out in an output region in step S626 of FIG. 11.

DESCRIPTION OF THE EMBODIMENTS

Figure 1:
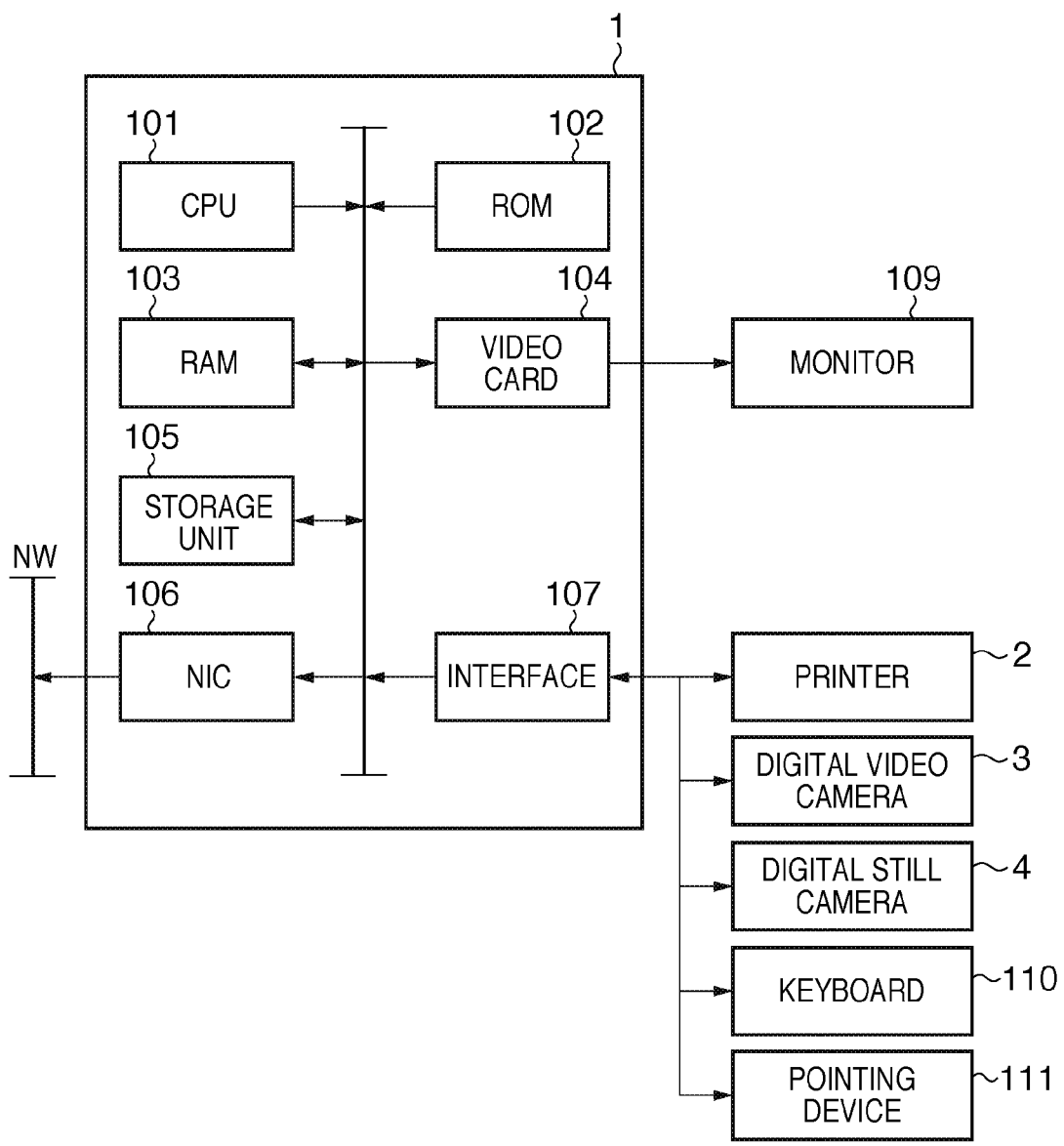
FIG. 1 is a schematic block diagram showing the arrangement of an image processing apparatus according to an aspect of the present invention.

Preferred embodiments of the present invention will now be described with reference to the accompanying drawing. The same reference numerals denote the same parts throughout the drawings, and a description thereof will not be repeated.

FIG. 1 is a schematic block diagram showing the arrangement of an image processing apparatus 1 according to an aspect of the present invention. The image processing apparatus 1 lays out a plurality of associated image data or image files (images) continuously captured (generated) by an image capturing apparatus in an output region such as a monitor (display screen) or a pasteboard.

The image processing apparatus 1 can determine, in the output region, an ideal layout that expresses the relative positional relationship between main objects (i.e., the moving direction of the main object) included in the plurality of image data or image files (images). If each image data contains image capturing information at the time of image data generation by the image capturing apparatus, the image processing apparatus 1 can reduce the process load using the image capturing information and more quickly determine an ideal layout of the plurality of image data in the output region.

The image processing apparatus 1 is formed from a general-purpose computer and includes a CPU 101, a ROM 102, a RAM 103, and a video card 104 connected to a monitor (e.g., a monitor having a touch panel) 109, as shown in FIG. 1. The image processing apparatus 1 also includes a storage unit (storage area) 105 such as a hard disk drive or a memory card. The image processing apparatus 1 also includes a serial bus interface 107 such as a USB or IEEE1394 connected to a keyboard 110 and a pointing device 111 such as a mouse, a stylus, or a tablet. The image processing apparatus 1 also includes a network interface card (NIC) 106 connected to a network NW. Note that the image processing apparatus 1 is not limited to the arrangement shown in FIG. 1. Some constituent elements may be omitted, or other constituent elements may be added.

In the image processing apparatus 1, the CPU 101, the ROM 102, the RAM 103, the video card 104, the storage unit 105, the NIC 106, and the interface 107 are connected to each other via a system bus 108. The image processing apparatus 1 is connected to a printer 2 and image capturing apparatuses such as a digital video camera 3 and a digital still camera 4 via the interface 107.

The CPU 101 loads a program stored in the ROM 102 or the storage unit 105 to the RAM 103 serving as a work memory and executes the program. The CPU 101 controls the above-described constituent elements via the system bus 108 in accordance with the program loaded to the RAM 103, thereby implementing the functions of the program.

In this embodiment, the CPU 101 functions as an image data obtaining unit 1011, a first position information obtaining unit 1012, a first positional relationship determination unit 1013, and an image capturing time information obtaining unit 1014, as shown in FIG. 2. The CPU 101 also functions as a second position information obtaining unit 1015, a second positional relationship determination unit 1016, a layout determination unit 1017, and a layout unit 1018. The CPU 101 implements the functions shown in FIG. 2 by itself or by cooperating with the above-described constituent elements. FIG. 2 is a block diagram showing a functional arrangement implemented by the CPU 101.

The image data obtaining unit 1011 has a function of inputting a plurality of image data to the image processing apparatus 1, that is, a function of obtaining a plurality of image data. More specifically, the image data obtaining unit 1011 obtains image data from an image capturing apparatus such as the digital video camera 3 or the digital still camera 4 which optically obtains image data. The image data obtaining unit 1011 can also obtain image data from a portable medium such as a magnetic disk, an optical disk, or a memory card. Note that image data obtained by the image data obtaining unit 1011 may be included in an image file. In other words, the image data obtaining unit 1011 can also obtain an image file.

The first position information obtaining unit 1012 has a function of obtaining, for each of the plurality of image data obtained by the image data obtaining unit 1011, first position information representing the depth-direction relative positional relationship between the image capturing apparatus and a main object contained in the image data.

Note that in this embodiment, the relative positional relationship of the main object is expressed as the depth-direction positional relationship between the main object and the image capturing apparatus or the vertical/horizontal positional relationship between the main objects. The depth-direction positional relationship between the main object and the image capturing apparatus is a positional relationship associated with the distance between them. The vertical/horizontal positional relationship between the main objects is the positional relationship between the main objects concerning the distance in the vertical/horizontal direction when the distance between the main object and the image capturing apparatus is constant. In this embodiment, this enables to express the three-dimensional moving direction of the main object with respect to the image capturing apparatus.

The first positional relationship determination unit 1013 has a function of determining the depth-direction relative positional relationship between the image capturing apparatus and the main object in each of the plurality of images based on the first position information obtained by the first position information obtaining unit 1012.

In this way, the first position information obtaining unit 1012 and the first positional relationship determination unit 1013 analyze the depth-direction relative positional relationship between the main object and the image capturing apparatus for the plurality of image data obtained by the image data obtaining unit 1011.

The image capturing time information obtaining unit 1014 has a function of obtaining the image capturing time information of each of a plurality of image data having the same first position information in the plurality of image data obtained by the image data obtaining unit 1011.

The second position information obtaining unit 1015 has a function of obtaining second position information representing the vertical/horizontal relative positional relationship between the main objects contained in the plurality of image data obtained by the image data obtaining unit 1011.

The second positional relationship determination unit 1016 has a function of determining the vertical/horizontal relative positional relationship between the main objects in the plurality of images based on the second position information obtained by the second position information obtaining unit 1015.

In this way, the second position information obtaining unit 1015 and the second positional relationship determination unit 1016 analyze the vertical/horizontal relative positional relationship between the main objects in the plurality of image data obtained by the image data obtaining unit 1011.

The layout determination unit 1017 has a function of determining the layout of the plurality of image data in an output region. More specifically, the layout determination unit 1017 determines the layout based on the positional relationships determined by the first positional relationship determination unit 1013 and the second positional relationship determination unit 1016 and the image capturing time information obtained by the image capturing time information obtaining unit 1014. For example, the layout determination unit 1017 determines at least one of the image size of each of the plurality of image data in the output region and the overlay order of the plurality of image data to be overlaid and output in the output region. In addition, the layout determination unit 1017 determines the layout by performing image processing (e.g., size change processing, trimming processing, chroma change processing, and sharpness change processing) for the plurality of image data.

The layout unit 1018 has a function of laying out each of the plurality of image data in the output region based on the layout determined by the layout determination unit 1017.

Placing focus on the main object, processing (layout processing) of laying out each of a plurality of image data generated by continuously capturing the main object in an output region such as a pasteboard will be explained here. In this embodiment, layout processing of laying out a plurality of image data on one pasteboard serving as an output region will be described. However, the output region to lay out the plurality of image data is not limited to one pasteboard. For example, two pasteboards may be used as the output region assuming, for example, spread pages.

FIG. 3 is a flowchart for explaining layout processing by the image processing apparatus 1. This layout processing is executed by causing the CPU 101 to comprehensively control the units of the image processing apparatus 1.

In step S302, the image processing apparatus obtains a plurality of image data from the image capturing apparatus (digital still camera 4) via the interface 107.

In step S304, pieces of position information representing the depth-direction relative positional relationship between the image capturing apparatus and the main object contained in each image data and the vertical/horizontal relative positional relationship between the main objects are obtained for the plurality of image data obtained in step S302.

In step S306, the depth-direction relative positional relationship between the image capturing apparatus and the main object in each of the plurality of image data obtained in step S302 and the vertical/horizontal relative positional relationship between the main objects are determined based on the position information obtained in step S304.

The processes in steps S304 and S306 will be described with reference to FIG. 4. Note that the image processing apparatus 1 is characterized by analyzing the depth-direction relative positional relationship between the main object and the image capturing apparatus. Hence, only processing associated with the depth-direction relative positional relationship between the main object and the image capturing apparatus will be explained here.

FIG. 4 is a view showing the depth-direction relative positional relationship between the image capturing apparatus and the main objects included in images corresponding to a plurality of image data. Referring to FIG. 4, IM1, IM2, and IM3 represent images captured by the image capturing apparatus (digital still camera 4). Note that the images IM1, IM2, and IM3 are captured when the main object is located at positions PT1, PT2, and PT3, respectively. An arrow A1 indicates movement of the main object. In this embodiment, the main object moves such that the depth-direction relative positional relationship between itself and the image capturing apparatus becomes closer (i.e., such that the main object comes closer to the image capturing apparatus).

In step S304, position information representing the depth-direction relative positional relationship between the main object and the image capturing apparatus is obtained for each of the three images IM1 to IM3. For example, information concerning the size of the main object is obtained as position information from each of the three images IM1 to IM3.

In step S306, the image processing apparatus sequentially compares the position information (main object size) of the image IM1 with that of the image IM2, the position information of the image IM1 with that of the image IM3, and the position information of the image IM2 with that of the image IM3. Based on the comparison results, the CPU determines the depth-direction relative positional relationship between the main object and the image capturing apparatus for each of the images IM1 to IM3.

Referring back to FIG. 3, in step S308, the image processing apparatus determines the layout of the plurality of image data in the output region based on the depth-direction relative positional relationship between the main object and the image capturing apparatus and the vertical/horizontal relative positional relationship between the main objects determined in step S306.

FIG. 5 is a view showing an example of ideal layout of the images IM1 to IM3 determined based on the depth-direction relative positional relationship between the main object and the image capturing apparatus. As described above, an ideal layout expresses the depth-direction relative positional relationship between the main object and the image capturing apparatus. Note that to express the depth-direction relative positional relationship between the main object and the image capturing apparatus, the images IM1 to IM3 may be displayed in different sizes, as shown in FIG. 5, or overlaid.

In step S310, the image processing apparatus lays out the plurality of image data obtained in step S302 in the output region based on the layout determined in step S308.

In step S312, the image processing apparatus outputs images (i.e., images that are laid out) corresponding to the plurality of image data laid out in the output region in step S310. Outputting images indicates causing the monitor 109 to display the images corresponding to the plurality of image data laid out in the output region or causing the printer 2 to print them. Outputting images also includes putting the plurality of image data laid out in the output region together into a file and storing it in the storage unit 105 or the like.

Note that in this embodiment, the image processing apparatus 1 executes the layout processing. Instead, the image capturing apparatus such as the digital video camera 3 or the digital still camera 4 may directly be connected to the printer 2 so that the printer 2 executes the above-described layout processing.

In the first to fifth embodiments below, layout processing by the image processing apparatus 1 will be described in detail. In the embodiments, coordinate information of image data (image) is used on occasion. The coordinate information is defined on a coordinate system which has the origin at the lower left corner of image data (image), an X-axis with positive values on the right side, and a Y-axis with positive values on the upper side.

The embodiments will be explained assuming the JPEG format that is an international standard of still image compression coding, that is, assuming that image data is a JPEG file. However, the image data need not always have the JPEG format and may have a general image data format such as bmp or tiff. Note that "International Standardization of Color Still Picture Coding", Journal of the Institute of Image Electronics Engineers of Japan, Vol. 18, No. 6, pp. 398-407, 1989 describes details of the JPEG image format.

When the image capturing apparatus is a digital video camera, a plurality of image data are generated by extracting frame images from a moving image. Hence, the image data may have a general moving image format such as MPEG-4 or AVI.

In general, an image file stores image data and image capturing information at the time of generation of the image data. The image capturing information includes at least one of focus detection information, distance information up to the main object, range information up to the main object, position information of the main object, light emission energy information of an electronic flash, and lens focal length information.

As the format of image capturing information, for example, Exif (Exchangeable Image Format) defined by JEIDA (Japan Electronic Industry Development Association) is usable. In the embodiments, either the Exif format that stores image capturing information in part of Exif tag information or a format that embeds image capturing information in image data can be used.

If a format that holds a plurality of image data in one image file is employed, the plurality of image data held in one image file are regarded as the plurality of image data in the embodiments.

First Embodiment

In the first embodiment, an example will be described in which an ideal layout is determined by changing the sizes of images corresponding to a plurality of image data generated by capturing the movement of a main object (person) which comes closer head on to an image capturing apparatus, and laying out the images in an output region. This layout can express the perspective between the main object and the image capturing apparatus.

FIG. 6 is a flowchart for explaining layout processing according to the first embodiment.

In step S402, the image processing apparatus obtains a plurality of image data from a digital still camera 4 via an interface 107. In this embodiment, the image processing apparatus obtains a plurality of image data captured by the digital still camera 4. However, the image processing apparatus may obtain a plurality of image data captured not by the digital still camera 4 but by an image capturing apparatus such as a digital video camera 3. Alternatively, a plurality of image data captured by an image capturing apparatus such as the digital still camera 4 may be stored in a storage unit 105 in advance, and the plurality of image data may be obtained from the storage unit 105. The image processing apparatus may obtain a plurality of image data stored in a portable medium such as a magnetic disk, an optical disk, or a memory card. If the digital still camera 4 can record the image capturing time, image data containing image capturing time information can be obtained. A plurality of image data are obtained in groups. A group indicates a set of image data of a single shooting scene. Layout processing to be described later is executed for each group. This prevents layout processing for a mixture of images of different shooting scenes. The group specific image obtaining can be executed not only by a user designation but also based on information indicating, for example, a plurality of images continuously taken in a continuous shooting mode, images captured at close image capturing times, images that are determined upon composition analysis to have similar compositions, or images having close GPS information (position information at the time of image capturing). By executing the following layout processing on the image data of the designated group, a state can be prevented wherein all images are lay out in no particular order.

FIG. 7 is a view showing examples of images corresponding to the plurality of image data obtained in step S402. In the first embodiment, an example in which three image data are obtained will be described. However, a plurality of image data in number other than three may be obtained, as a matter of course. As shown in FIG. 7, images IM4, IM5, and IM6 correspond to the three image data obtained in step S402, respectively.

In step S404, the main object is detected from each of the plurality of image data obtained in step S402. The image capturing apparatus is generally supposed to capture the main object located at the central position. For this reason, it is possible to detect the main object based on, for example, the position information of each object included in the image data. More specifically, the image processing apparatus performs face detection to extract the position information of each person from the image data. Then, a person whose position information is nearest to the central portion of the image data is detected as the main object. Note that the main object detection can be done by applying any method well-known by those skilled in the art, and a detailed description thereof will be omitted here.

In step S406, a specific part of the main object detected in step S404 is detected from each of the plurality of image data obtained in step S402. For example, the face (face region) of the person detected as the main object in step S404 is defined as the specific part. The position information of the face region is detected (extracted). In this embodiment, the image processing apparatus extracts pieces of coordinate information of the four points of a rectangle which encloses the face region of the person detected as the main object. However, the specific part of the main object need not always be the person's face and may also be the person's eye, nose, or mouth.

More specifically, a face region FA4 is detected from the image IM4 corresponding to one of the three image data obtained in step S402, as shown in FIG. 7. Then, pieces of coordinate information (xfa-1,yfa-1), (xfa-2,yfa-2), (xfa-3, yfa-3), and (xfa-4,yfa-4) of the four points of a rectangle which encloses the face region FA4 are extracted. Similarly, a face region FA5 is detected from the image IM5, and pieces of coordinate information (xfb-1,yfb-1), (xfb-2,yfb-2), (xfb-3, yfb-3), and (xfb-4,yfb-4) of the four points of a rectangle which encloses the face region FA5 are extracted. In the same way, a face region FA6 is detected from the image IM6, and pieces of coordinate information (xfc-1,yfc-1), (xfc-2,yfc-2), (xfc-3,yfc-3), and (xfc-4,yfc-4) of the four points of a rectangle which encloses the face region FA6 are extracted.

Note that in this embodiment, the image processing apparatus detects (extracts) each face region that is the specific part of the main object as the pieces of coordinate information of four points. However, it may be detected as the graphic information of a polygon whose center is located at the central coordinates of the face region. That is, any other information capable of specifying the size of the specific part (main object) is usable, as will be described later.

In step S408, the image processing apparatus calculates the size of the specific part (i.e., the size of the main object) detected in step S406. The size of each face region is calculated, letting, for example, Sa be the size of the face region FA4 of the image IM4, Sb be the size of the face region FA5 of the image IM5, and Sc be the size of the face region FA6 of the image IM6. In this embodiment, each face region is detected (extracted) as the pieces of coordinate information of four points. Hence, the size Sa of the face region FA4 of the image IM4 is calculated by ((xfa-1)−(xfa-2))×((yfa-1)−(yfa-3)). Similarly, the size Sb of the face region FA5 of the image IM5 is calculated by ((xfb-1)−(xfb-2))×((yfb-1)−(yfb-3)). In the same manner, the size Sc of the face region FA6 of the image IM6 is calculated by ((xfc-1)−(xfc-2))×((yfc-1)−(yfc-3)).

In step S410, the image processing apparatus analyzes depth-direction relative positional relationship between the main object and the digital still camera 4 based on the size of each specific part calculated in step S408. The distance between the main object and the digital still camera 4 is supposed to be shorter for an image in which the size of the specific part calculated in step S408 is larger. The distance between the main object and the digital still camera 4 is supposed to be longer for an image in which the size of the specific part calculated in step S408 is smaller. The image processing apparatus analyzes the depth-direction relative positional relationship between the main object and the digital still camera 4 by comparing the size Sa of the face region FA4 in the image IM4, the size Sb of the face region in the image IM5, and the size Sc of the face region FA6 in the image IM6 with each other (i.e., confirming the relationship in size).

More specifically, if Sa<Sb<Sc, the image processing apparatus analyzes that the depth-direction relative positional relationship between the main object and the digital still camera 4 gets closer (the main object comes closer to the digital still camera 4) in the order of the images IM4, IM5, and IM6. On the other hand, if Sa>Sb>Sc, the image processing apparatus analyzes that the depth-direction relative positional relationship between the main object and the digital still camera 4 becomes farther (the main object moves away from the digital still camera 4) in the order of the images IM4, IM5, and IM6. In this embodiment, Sa<Sb<Sc is obtained as the depth-direction relative positional relationship between the main object and the digital still camera 4.

In step S412, the image processing apparatus determines, based on the depth-direction relative positional relationship between the main object and the digital still camera 4 analyzed in step S410, the sizes of the images when laying out the plurality of image data obtained in step S402 in the output region. More specifically, the sizes of the images IM4, IM5, and IM6 are determined such that they fit in the output region. In this embodiment, the analysis result (Sa<Sb<Sc) obtained regarding the depth-direction relative positional relationship between the main object and the digital still camera 4 indicates that the main object is farthest from the digital still camera 4 in the image IM4 and closest to the digital still camera 4 in the image IM6. Hence, the sizes of the images IM4, IM5, and IM6 are determined based on the ratio of Sa:Sb:Sc.

Note that the sizes of the images IM4, IM5, and IM6 may be determined by a ratio based on Sa<Sb<Sc. More specifically, the size may be larger for an image having a closer relative positional relationship between the main object and the image capturing apparatus and smaller for an image having a farther relative positional relationship between the main object and the image capturing apparatus.

Determining the size ratio of the images based on Sa:Sb:Sc makes it possible to place emphasis on the relative positional relationship between the main object and the image capturing apparatus. For example, to put emphasis on the relative positional relationship between the main object and the image capturing apparatus, the ratio of Sa:Sb:Sc is increased. To diminish the relative positional relationship between the main object and the image capturing apparatus, the ratio of Sa:Sb:Sc is decreased.

In this embodiment, an example in which the main object moves in one direction has been explained. However, the moving direction of the main object may change. In this case as well, the sizes of the images are determined in accordance with the depth-direction relative positional relationship between the main object and the image capturing apparatus, as in this embodiment. More specifically, the main object that has approached the image capturing apparatus may change its direction and move away from the image capturing apparatus. Even in this case, the size is larger for an image having a closer depth-direction relative positional relationship between the main object and the image capturing apparatus and smaller for an image having a farther depth-direction relative positional relationship between the main object and the image capturing apparatus. This also applies to a case in which the main object that has moved away from the image capturing apparatus changes its direction and moves closer to the image capturing apparatus.

In step S414, the image processing apparatus scales, based on the image sizes determined in step S412, the sizes of the images corresponding to the plurality of image data obtained in step S402.

Figure 8:
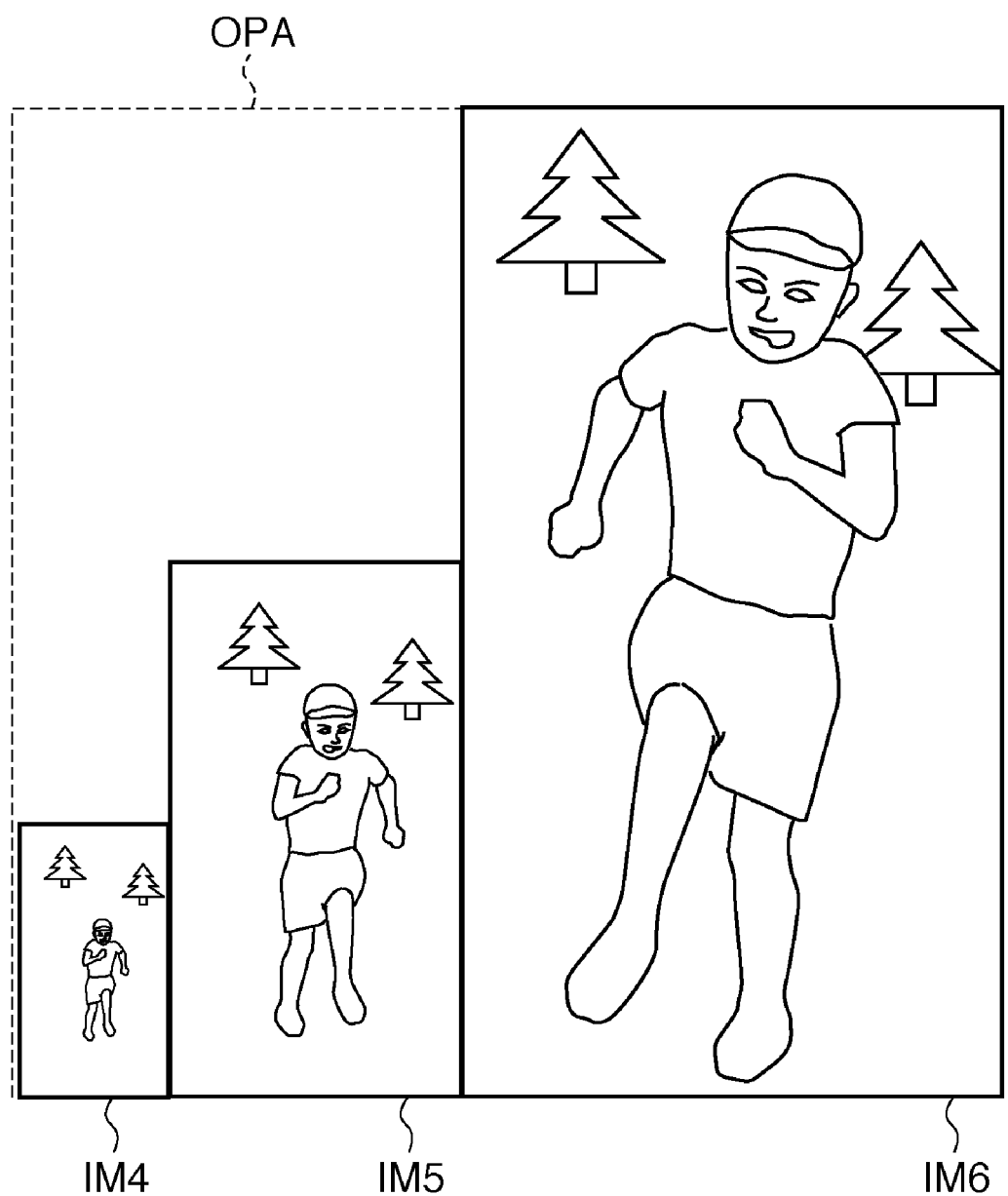
FIG. 8 is a view showing an example in which three images are laid out in an output region in step S416 of FIG. 6.

In step S416, the image processing apparatus lays out, in the output region, the image data scaled in step S412. FIG. 8 is a view showing an example in which the three images IM4, IM5, and IM6 are laid out in an output region OPA in step S416.

In this embodiment, the three images IM4, IM5, and IM6 are laid out with their lower edges arranged in line with each other, as shown in FIG. 8. However, the layout of the three images IM4, IM5, and IM6 in the output region OPA is not limited to this. For example, the three images IM4, IM5, and IM6 may be laid out with their upper edges or central portions arranged in line with each other. Alternatively, the three images IM4, IM5, and IM6 are laid out with the specific part positions arranged in line with each other.

In this embodiment, the three images IM4, IM5, and IM6 are laid out while being in contact on the sides, as shown in FIG. 8. However, the layout of the three images IM4, IM5, and IM6 in the output region OPA is not limited to this. For example, the three images IM4, IM5, and IM6 may be laid out while leaving spaces between them.

In this embodiment, the three images IM4, IM5, and IM6 are laid out while making the vertical size of the image IM6 match that of the output region OPA (i.e., making the most of the output region OPA). However, the three images IM4, IM5, and IM6 may be laid out in a region smaller than the output region OPA. In this case as well, the images IM4, IM5, and IM6 are laid out after determining their sizes such that the images fit in the region smaller than the output region OPA based on the depth-direction relative positional relationship between the main object and the image capturing apparatus.

In step S418, the image processing apparatus outputs the images (i.e., images that are laid out) corresponding to the plurality of image data laid out in the output region in step S416.

As described above, in the first embodiment, the specific part of the main object is detected, and the depth-direction relative positional relationship between the main object and the image capturing apparatus is analyzed for each of the plurality of image data. The sizes of the images corresponding to the plurality of image data are determined based on the analysis result, thereby determining a layout that expresses the depth-direction relative positional relationship between the main object and the image capturing apparatus. In other words, it is possible to determine an ideal layout that expresses the relative positional relationship between the main objects when laying out the plurality of image data (images) in the output region.

In this embodiment, it is possible to accurately analyze the relative positional relationship between the main object and the image capturing apparatus because the size of the specific part is calculated. However, image processing or calculating the size of the specific part generally yields a heavy process load. It is therefore to analyze the depth-direction relative positional relationship between the main object and the image capturing apparatus while reducing the process load.

For example, the main object in focus may continuously be captured while intentionally changing the focal length. In such a case, the depth-direction relative positional relationship between the main object and the image capturing apparatus can be analyzed using, for example, focal length information, distance information up to the main object, or position information of the main object. Hence, if it is possible to obtain focus detection information, distance information up to the main object, range information up to the main object, or light emission energy information of an electronic flash, the depth-direction relative positional relationship between the main object and the image capturing apparatus is analyzed based on the image capturing information.

More specifically, the image processing apparatus analyzes that the smaller the value of focus detection information, distance information up to the main object, range information up to the main object, position information of the main object, or light emission energy information of an electronic flash is, the closer the relative positional relationship between the main object and the image capturing apparatus for an image is. That is, analyzing the depth-direction relative positional relationship between the main object and the image capturing apparatus using image capturing information makes it possible to lighten the process load as compared to the image processing of calculating the size of the specific part.

Note that a recent image capturing apparatus often has a face region detection function or a specific part detection function. This function of the image capturing apparatus allows reducing the process load on an image processing apparatus 1 in detecting the specific part (e.g., person's face region) of the main object.

In this embodiment, an example in which the main object is a person has been described. However, the main object need be not a person but, for example, a car. In this case, the size of a tire or a mirror of the car serving as the main object is calculated, and the depth-direction relative positional relationship between the main object and the image capturing apparatus is analyzed.

In this embodiment, a case has been described in which the image processing apparatus 1 obtains image data containing image capturing information from the image capturing apparatus. In recent years, however, systems that directly connect an image capturing apparatus to a printer have also been proposed. In such a system, image data and image capturing information need not always be included in a file. Instead, image data and image capturing information may be obtained separately.

The embodiment has been described using an example in which a plurality of image data are obtained by capturing the movement of a main object (person) which comes closer head on to the image capturing apparatus while fixing the scaling ratio of the image capturing apparatus. However, it is difficult to analyze the depth-direction relative positional relationship between the main object and the image capturing apparatus based on only the size of the main object if the plurality of image data are obtained while changing the scaling ratio of the image capturing apparatus. In such a case, the depth-direction relative positional relationship between the main object and the image capturing apparatus is analyzed based on the correlation in size between the main object and a background object. If the image data contains image capturing information such as lens focal length information, it is possible to accurately analyze the depth-direction relative positional relationship between the main object and the image capturing apparatus using the lens focal length information.

In this embodiment, a case has been described in which the image processing apparatus 1 obtains a plurality of associated image data. However, the image processing apparatus may obtain a plurality of image data including a mixture of associated and unassociated image data. In this case, processing of selecting associated image data from the plurality of image data is added. Note that when selecting associated image data, image capturing information (e.g., image capturing time information or continuous image capturing information) contained in the image data or information representing association is used. Note that if the image data contains no information representing association, associated image data can be selected using the degree of correlation between image data or image analysis such as person determination.

In this embodiment, the image processing apparatus scales the sizes of images corresponding to the plurality of image data and lays them out in the output region based on the depth-direction relative positional relationship between the main object and the image capturing apparatus. However, when creating a digital album, the image processing apparatus may determine the size of a frame to embed (lay out) images and scale the image sizes in accordance with the frame size. In such a case, the frame size is determined based on the depth-direction relative positional relationship between the main object and the image capturing apparatus.

Second Embodiment

In the second embodiment, an example will be described in which an ideal layout is determined by overlaying images corresponding to a plurality of image data generated by capturing the movement of a main object (person) which comes closer head on to an image capturing apparatus, and laying out the images in an output region. This layout can express the perspective between the main object and the image capturing apparatus.

Figure 9:
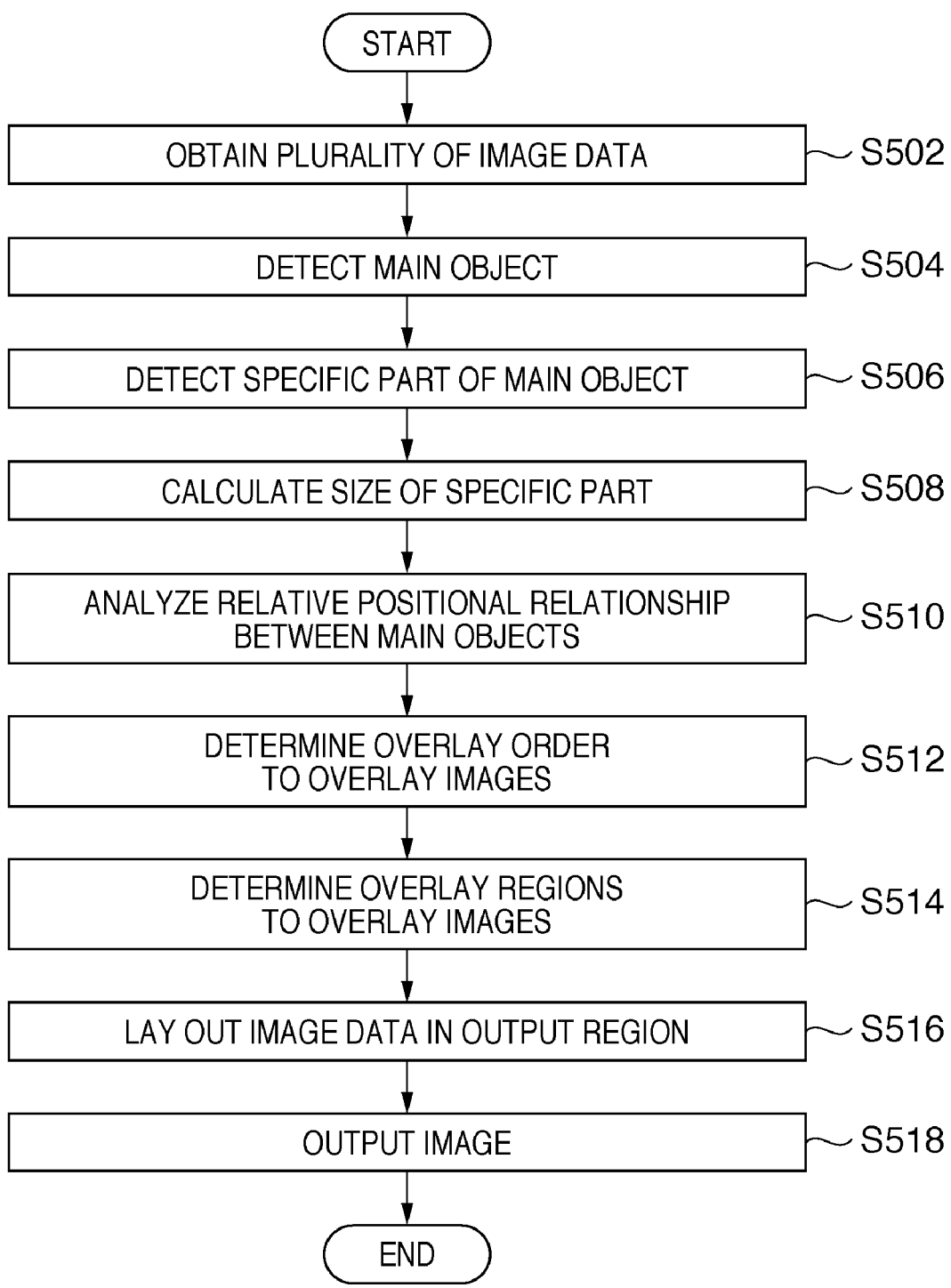
FIG. 9 is a flowchart for explaining layout processing according to the second embodiment.

FIG. 9 is a flowchart for explaining layout processing according to the second embodiment. Processes in steps S502 to S510 are the same as in steps S402 to S410 of the first embodiment, and a detailed description thereof will not be repeated here. In step S502, the image processing apparatus obtains three image data (images IM4, IM5, and IM6) belonging to a single group, as in the first embodiment (FIG. 7).

In step S512, the image processing apparatus determines the overlay order of the images corresponding to the plurality of image data in the output region based on the depth-direction relative positional relationship between the main object and a digital still camera 4 analyzed in step S510. In this embodiment, regarding the depth-direction relative positional relationship between the main object and the digital still camera 4, an analysis result (Sa<Sb<Sc) is obtained which indicates that the main object is farthest from the digital still camera 4 in the image IM4 and closest to the digital still camera 4 in the image IM6. In this case, the overlay order is determined to overlay the image IM5 on the image IM4 and the image IM6 on the image IM5.

That is, the image processing apparatus determines the overlay order such that an image having a farther depth-direction relative positional relationship between the main object and the image capturing apparatus is overlaid on the upper side, whereas an image having a closer depth-direction relative positional relationship between the main object and the image capturing apparatus is overlaid on the lower side. This allows determining a layout that expresses the relative positional relationship between the main object and the image capturing apparatus using the visual characteristic of the user (appreciator) concerning the perspective.

Note that even for a plurality of images obtained by capturing the movement of the main object (person) that moves away from the image capturing apparatus, the overlay order is determined based on the depth-direction relative positional relationship between the main object and the image capturing apparatus. Assume that the images IM4, IM5, and IM6 correspond to three image data obtained by capturing the movement of the main object that moves away from the image capturing apparatus, respectively. In this case, the overlay order is determined to overlay the image IM5 on the image IM6 and the image IM4 on the image IM5.

In step S514, the image processing apparatus determines overlay regions where the images corresponding to the plurality of image data are overlaid in the output region. In this embodiment, the overlay regions are determined not to make the main objects contained in the plurality of image data overlap each other. The sizes of the overlay regions may be changed because in this embodiment, it is important to determine (control) the overlay order of the images corresponding to the plurality of image data in the output region. For example, the overlay regions may be determined by a fixed value or a fixed ratio.

Figure 10:
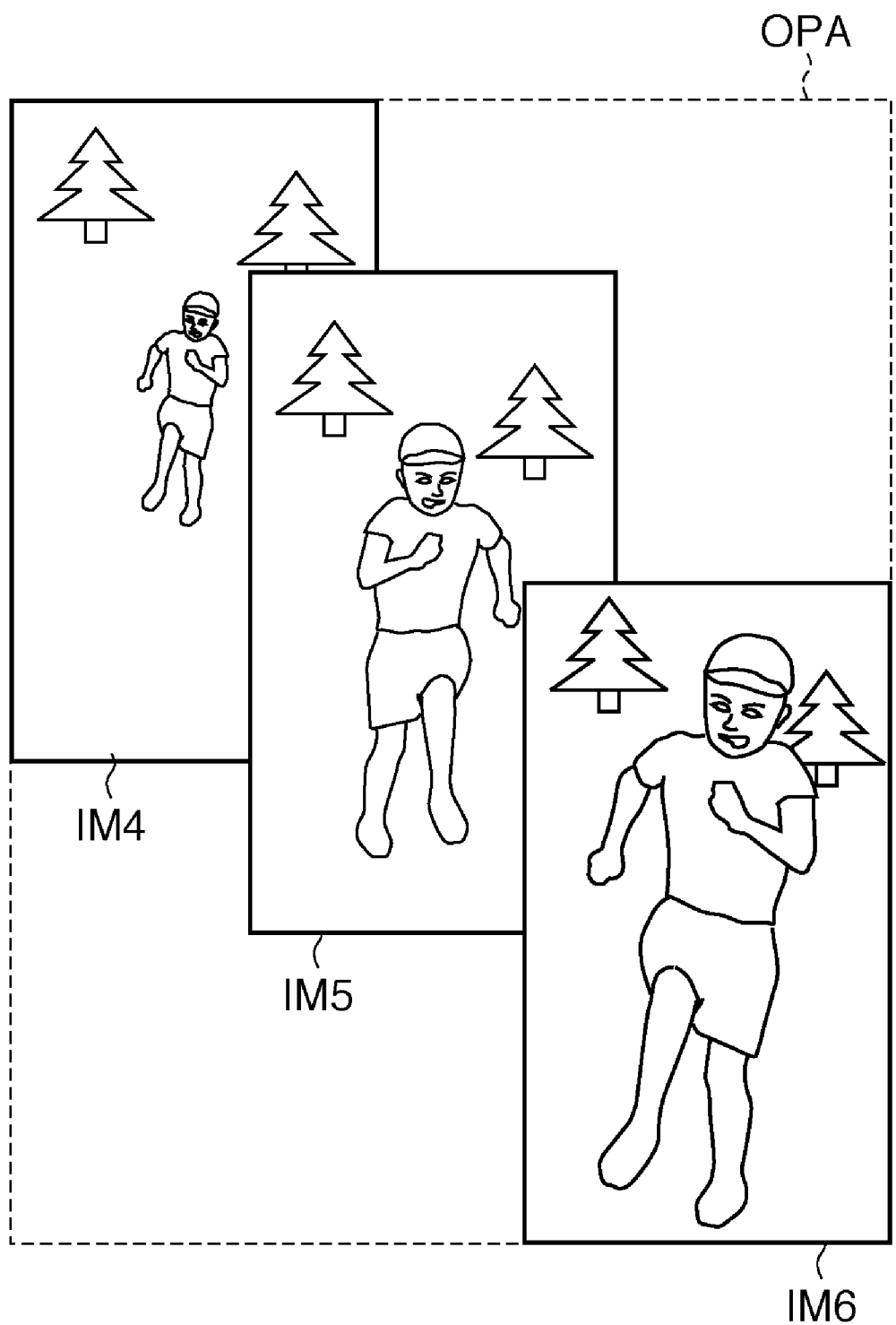
FIG. 10 is a view showing an example in which three images are overlaid and laid out in an output region in step S516 of FIG. 9.

In step S516, the image processing apparatus lays out, in the output region, the images corresponding to the plurality of image data obtained in step S502 while overlaying them based on the overlay order determined in step S512 and the overlay regions determined in step S514. FIG. 10 is a view showing an example in which the three images IM4, IM5, and IM6 are overlaid and laid out in an output region OPA in step S516.

Note that in this embodiment, an image having a farther depth-direction relative positional relationship between the main object and the image capturing apparatus is laid out on the upper side of the output region, and an image having a closer depth-direction relative positional relationship between the main object and the image capturing apparatus is laid out on the lower side of the output region, as shown in FIG. 10. However, an image having a farther depth-direction relative positional relationship between the main object and the image capturing apparatus may be laid out on the lower side of the output region, and an image having a closer depth-direction relative positional relationship between the main object and the image capturing apparatus may be laid out on the upper side of the output region. Alternatively, an image having a farther depth-direction relative positional relationship between the main object and the image capturing apparatus may be laid out on the left (or right) side of the output region, and an image having a closer depth-direction relative positional relationship between the main object and the image capturing apparatus may be laid out on the right (or left) side of the output region.

In step S518, the image processing apparatus outputs the images (i.e., images that are laid out) corresponding to the plurality of image data laid out in the output region in step S516.

As described above, in the second embodiment, the specific part of the main object is detected, and the depth-direction relative positional relationship between the main object and the image capturing apparatus is analyzed for each of the plurality of image data. The overlay order and the overlay regions of the images corresponding to the plurality of image data in the output region are determined based on the analysis result, thereby determining a layout that expresses the depth-direction relative positional relationship between the main object and the image capturing apparatus. In other words, it is possible to determine an ideal layout that expresses the relative positional relationship between the main objects when laying out the plurality of image data (images) in the output region.

Frames larger than the images corresponding to the image data may be prepared, and not the image data but the frames may be overlaid. In other words, the frames in the output region may be overlaid instead of overlaying the image data.

In this embodiment, an example in which the main object moves in one direction has been explained. However, the moving direction of the main object may change. In this case as well, the overlay order and the overlay regions are determined in accordance with the depth-direction relative positional relationship between the main object and the image capturing apparatus, as in this embodiment. More specifically, the main object that has approached the image capturing apparatus may change its direction and move away from the image capturing apparatus. Even in this case, an image having a closer depth-direction relative positional relationship between the main object and the image capturing apparatus is overlaid on the upper side, and an image having a farther depth-direction relative positional relationship between the main object and the image capturing apparatus is overlaid on the lower side. This also applies to a case in which the main object that has moved away from the image capturing apparatus changes its direction and moves closer to the image capturing apparatus.

The second embodiment may be combined with the first embodiment to determine the image sizes, the overlay order, and the overlay regions based on the depth-direction relative positional relationship between the main object and the image capturing apparatus. This allows determining a layout which more effectively expresses the depth-direction relative positional relationship between the main object and the image capturing apparatus.

Third Embodiment

In the third embodiment, an example will be described in which an ideal layout is determined by changing the sizes of images corresponding to a plurality of image data generated by capturing the movement of a main object (person) which moves in the vertical and horizontal directions while coming closer to an image capturing apparatus, overlaying the images, and laying them out in an output region. This layout can express the perspective between the main object and the image capturing apparatus.

Figure 11:
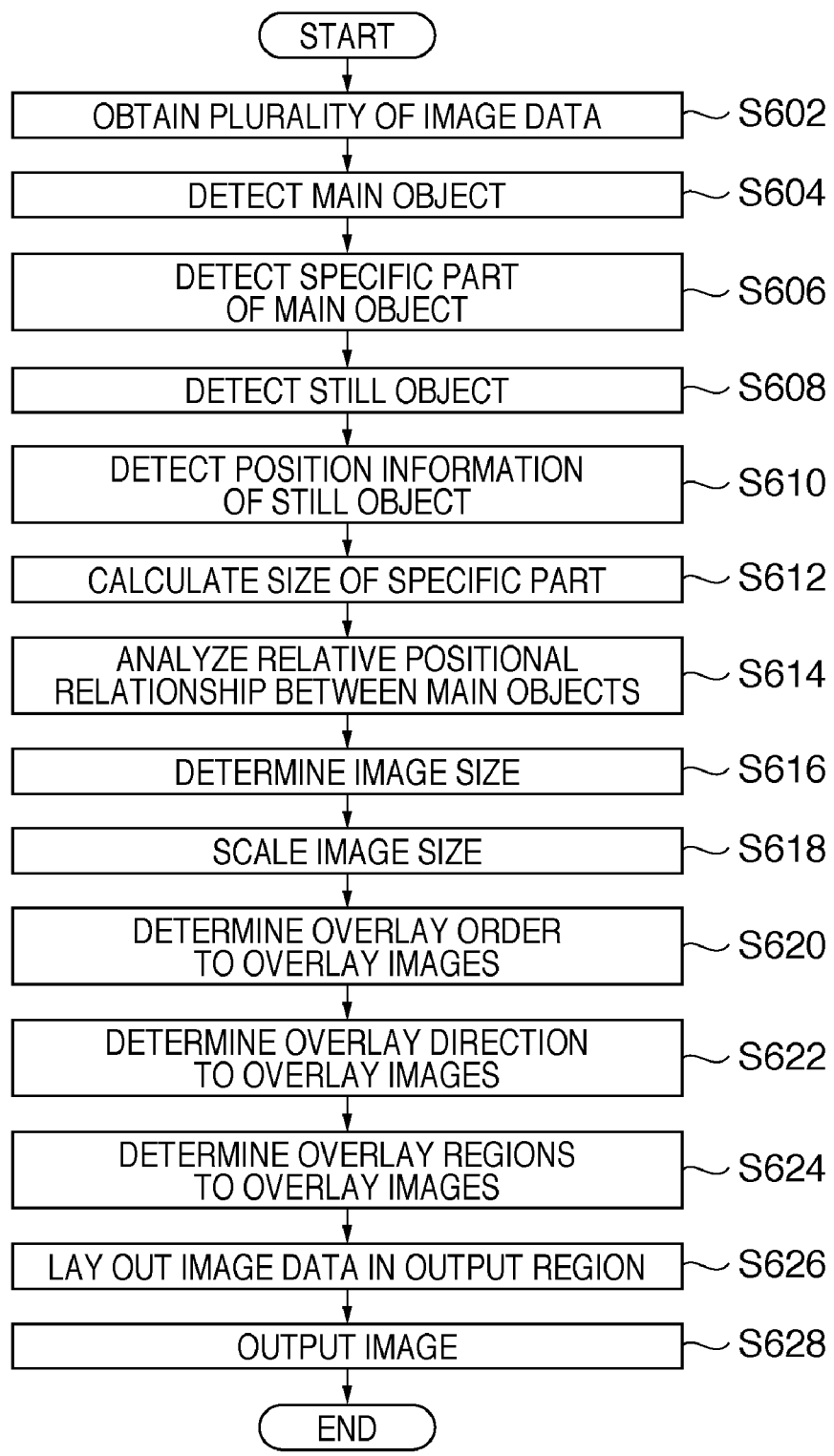
FIG. 11 is a flowchart for explaining layout processing according to the third embodiment.
Figure 12:
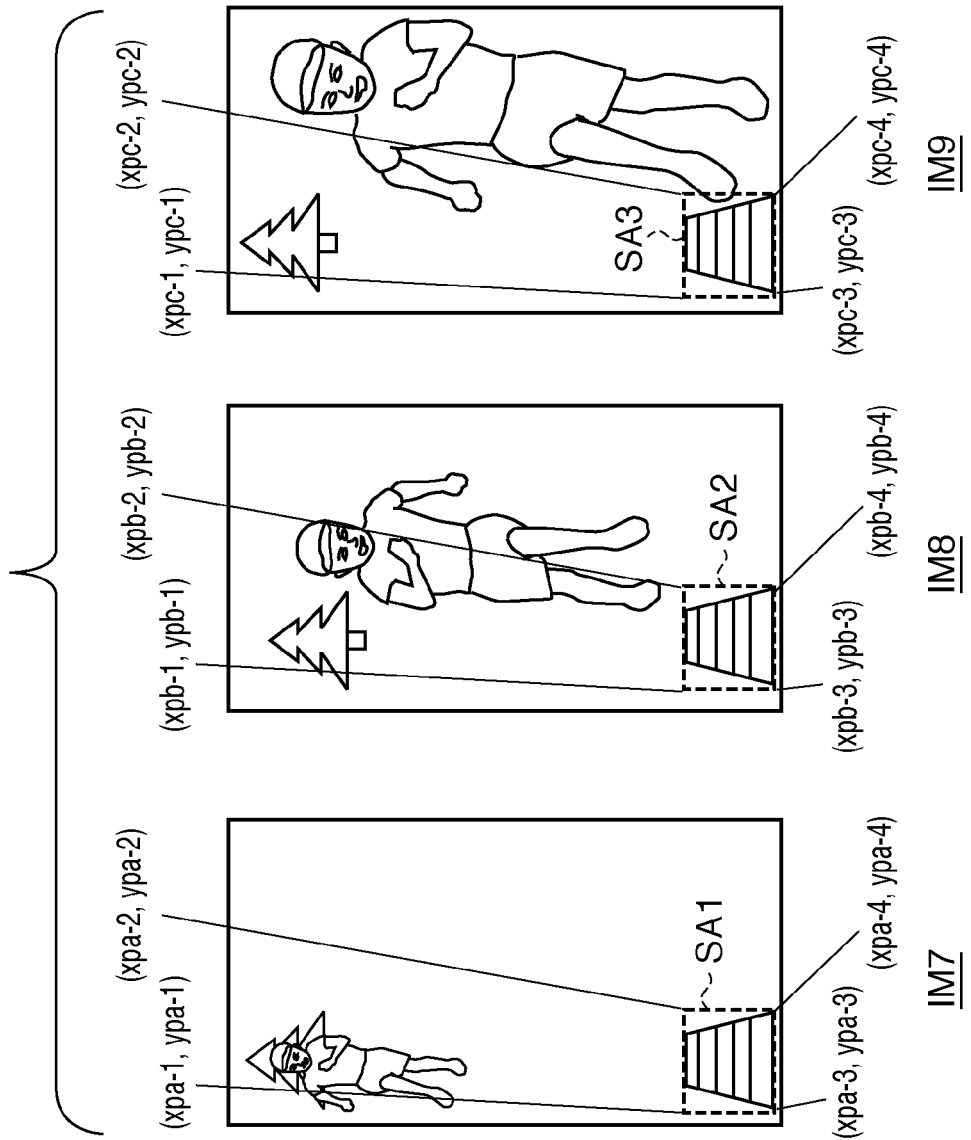
FIG. 12 is a view showing examples of images corresponding to a plurality of image data obtained in step S602 of FIG. 11.

FIG. 11 is a flowchart for explaining layout processing according to the third embodiment. Processes in steps S602 to S606 are the same as in steps S402 to S406 of the first embodiment, and a detailed description thereof will not be repeated here. In step S602, the image processing apparatus obtains three image data (images IM7, IM8, and IM9) generated by capturing the movement of the main object (person) which moves from the far left side to the near right side viewed from the image capturing apparatus, as shown in FIG. 12. In this embodiment, an example in which three image data are obtained will be described. However, a plurality of image data in number other than three may be obtained, as a matter of course. FIG. 12 is a view showing examples of images corresponding to the plurality of image data obtained in step S602.

In step S608, a still object included in background objects is detected from each of the plurality of image data obtained in step S602. The still object is included in all of the plurality of image data. In this embodiment, an inanimate object such as a tree or a building is detected as the still object.

Note that if the image processing apparatus has a function of detecting a blur amount, the still object may be detected based on the blur amount. This makes it possible to reduce the still object detection error ratio and more accurately analyze the relative positional relationship between the main objects.

In step S610, the image processing apparatus detects (extracts) the position information of the still object detected in step S608. In this embodiment, the image processing apparatus extracts pieces of coordinate information of the four points of a rectangle which encloses the still object detected in step S608.

More specifically, as shown in FIG. 12, pieces of coordinate information (xpa-1,ypa-1), (xpa-2,ypa-2), (xpa-3,ypa-3), and (xpa-4,ypa-4) of the four points of a rectangle which encloses a still object SA1 detected from the image IM7 are extracted. Similarly, pieces of coordinate information (xpb-1,ypb-1), (xpb-2,ypb-2), (xpb-3,ypb-3), and (xpb-4,ypb-4) of the four points of a rectangle which encloses a still object SA2 detected from the image IM8 are extracted. In the same way, pieces of coordinate information (xpc-1,ypc-1), (xpc-2,ypc-2), (xpc-3,ypc-3), and (xpc-4,ypc-4) of the four points of a rectangle which encloses a still object SA3 detected from the image IM9 are extracted.

Note that in this embodiment, the image processing apparatus detects (extracts) the still object as the pieces of coordinate information of four points. However, it may be detected as the central coordinates of the still object or the graphic information of a polygon whose center is located at the central coordinates of the still object. That is, any other information capable of specifying the moving direction of the main object based on the position of the still object is usable.

In step S612, the image processing apparatus calculates the size of the specific part (i.e., the size of the main object) detected in step S606. The process in step S612 is the same as in step S408 of the first embodiment, and a detailed description thereof will not be repeated here.

In step S614, the image processing apparatus analyzes the relative positional relationship between the main objects. Since analysis of the depth-direction relative positional relationship between the main object and a digital still camera 4 has been described in the first embodiment, analysis of the vertical/horizontal positional relationship between the main objects will be explained here.

More specifically, the positional relationship between the main object and the still object is analyzed first based on the coordinate information of the specific part of the main object detected in step S606 and the coordinate information of the still object detected in step S610.

Let La be the horizontal distance between the upper left point of the face region that is the specific part of the main object and the upper left point of the still object in the image IM7. Let Lb be the horizontal distance between the upper left point of the face region that is the specific part of the main object and the upper left point of the still object in the image IM8. Let Lc be the horizontal distance between the upper left point of the face region that is the specific part of the main object and the upper left point of the still object in the image IM9.

For the image IM7, La=((xpa-1)−(xfa-1)) is calculated using the coordinate information (xfa-1,yfa-1) of the upper left point of the face region and the coordinate information (xpa-1,ypa-1) of the upper left point of the still object. Similarly, for the image IM8, Lb=((xpb-1)−(xfb-1)) is calculated using the coordinate information (xfb-1,yfb-1) of the upper left point of the face region and the coordinate information (xpb-1,ypb-1) of the upper left point of the still object. In the same way, for the image IM9, Lc=((xpc-1)−(xfc-1)) is calculated using the coordinate information (xfc-1,yfc-1) of the upper left point of the face region and the coordinate information (xpc-1,ypc-1) of the upper left point of the still object.

The values La, Lb, and Lc calculated for the images IM7, IM8, and IM9, respectively, are compared, thereby analyzing the horizontal relative positional relationship between persons that are the main objects. More specifically, the image processing apparatus analyzes that an image for which the horizontal distance between the still object and the main object is larger is located relatively on the right side.

In this embodiment, a relationship given by La>Lb>Lc is obtained. Hence, the image processing apparatus analyzes that the main object included in the image IM7 is located relatively at the leftmost position, and the main object included in the image IM9 is located relatively at the rightmost position. This indicates that the main object moves from the left side to the right side in the order of the images IM7, IM8, and IM9.

It is possible to determine a layout that expresses the vertical/horizontal relative positional relationships between the main objects by laying out the images corresponding to the plurality of image data in the output region while maintaining the vertical/horizontal relative positional relationship between the main objects.

In this embodiment, image data captured by the image capturing apparatus whose position with respect to the main object is fixed has been described. For image data captured by the image capturing apparatus while changing its position with respect to the main object as well, the vertical/horizontal relative positional relationship between the main objects can be analyzed by detecting (extracting) the position information of the still object.

If image data can contain the angle (angle information) of the lens of the image capturing apparatus with respect to the main object, the use of the angle information allows analyzing the vertical/horizontal relative positional relationship between the objects. Note that an image capturing apparatus having a sensor or the like can easily analyze a change in the angle of the lens using the sensor.

In this embodiment, the vertical/horizontal relative positional relationship between the main objects is analyzed using the image data. However, if the image capturing apparatus has a function of detecting the moving direction, and image data can contain the detection result, the process load in steps S608, S610, and S612 can be reduced using the detection result. Similarly, if the image capturing apparatus has a function of detecting lens angle information, and image data can contain the detection result, process load in steps S608, S610, and S612 can be reduced using the detection result.

Note that there have been proposed a number of methods of analyzing the vertical/horizontal relative positional relationship between the main objects (e.g., patent reference 1). Such a method may be applied to this embodiment.

In step S616, the image processing apparatus determines, based on the depth-direction relative positional relationship between the main object and the digital still camera 4 analyzed in step S614, the sizes of the images when laying out the plurality of image data obtained in step S602 in the output region. The process in step S616 is the same as in step S412 of the first embodiment, and a detailed description thereof will not be repeated here.

In step S618, the image processing apparatus scales, based on the image sizes determined in step S616, the sizes of the images corresponding to the plurality of image data obtained in step S602. The process in step S618 is the same as in step S414 of the first embodiment, and a detailed description thereof will not be repeated here.

In step S620, the image processing apparatus determines the overlay order of the images corresponding to the plurality of image data in the output region based on the depth-direction relative positional relationship between the main object and the digital still camera 4 analyzed in step S614. The process in step S620 is the same as in step S512 of the second embodiment, and a detailed description thereof will not be repeated here.

In step S622, the image processing apparatus determines the overlay direction of the images corresponding to the plurality of image data in the output region based on the vertical/horizontal relative positional relationship between the main objects analyzed in step S614. In this embodiment, the main object moves from the left side to the right side relative to the image capturing apparatus. For this reason, the overlay direction is determined to lay out the image IM8 on the right side of the image IM7 and the image IM9 on the right side of the image IM8.

If the main object moves from the right side to the left side relative to the image capturing apparatus, the overlay direction is determined to lay out the image IM8 on the left side of the image IM7 and the image IM9 on the left side of the image IM8.

Note that if the main object moves from the upper side to the lower side relative to the image capturing apparatus, it is also necessary to determine the overlay direction concerning the vertical direction of the main object. More specifically, the overlay direction is determined to lay out an image having a farther vertical relative positional relationship between the main objects on the upper side, and an image having a closer vertical relative positional relationship between the main objects on the lower side.

In step S624, the image processing apparatus determines overlay regions where the images corresponding to the plurality of image data are overlaid in the output region. In this embodiment, the overlay regions are determined not to make the main objects contained in the plurality of image data overlap each other. The sizes of the overlay regions may be changed because in this embodiment, it is important to lay out the images corresponding to the plurality of image data in accordance with the vertical/horizontal relative positional relationship between the main objects.

It is also possible to adaptively determine the vertical size of each overlay region based on the vertical relative positional relationship between the main objects and the horizontal size of each overlay region based on the horizontal relative positional relationship between the main objects.

More specifically, the vertical size of each overlay region is determined based on the size (Sa, Sb, and Sc in the embodiment) of the specific part calculated in step S612. The horizontal size of each overlay region is determined based on the horizontal relative position information (La, Lb, and Lc in the embodiment) of the main object calculated in step S614. This makes it possible to determine a layout that more accurately expresses the vertical/horizontal relative positional relationship between the main objects.

In step S626, the image processing apparatus lays out the image data scaled in step S618 in the output region based on the overlay order determined in step S620, the overlay direction determined in step S622, and the overlay regions determined in step S624. FIG. 13 is a view showing an example in which the three images IM7, IM8, and IM9 laid out in the output region in step S626.

In step S628, the image processing apparatus outputs the images (i.e., images that are laid out) corresponding to the plurality of image data laid out in the output region in step S626.

As described above, in the third embodiment, the layout of the image data in the output region is determined based on not only the depth-direction relative positional relationship between the main object and the image capturing apparatus but also the vertical/horizontal relative positional relationship between the main objects. This allows determining a layout which more effectively expresses the relative positional relationship between the main objects.

Note that in this embodiment, the sizes of the image data respectively corresponding to the plurality of image data are changed. Then, the images are overlaid and laid out in the output region. However, only changing the image sizes or only overlaying the images may suffice.

Fourth Embodiment

In the fourth embodiment, a case will be described in which a plurality of image data obtained from an image capturing apparatus include a plurality of image data having the same depth-direction positional relationship between the main object and the image capturing apparatus or the same vertical/horizontal positional relationship between the main objects. Such a situation occurs when, for example, the main object moves circularly, like a track race. In this case, the layout processing of the first, second, or third embodiment may cause the images to completely overlap when laying out the image data in the output region. Layout processing will be described below, which prevents images from overlapping even if the plurality of image data obtained from the image capturing apparatus include a plurality of image data having the same depth-direction positional relationship between the main object and the image capturing apparatus or the same vertical/horizontal positional relationship between the main objects.

Figure 14:
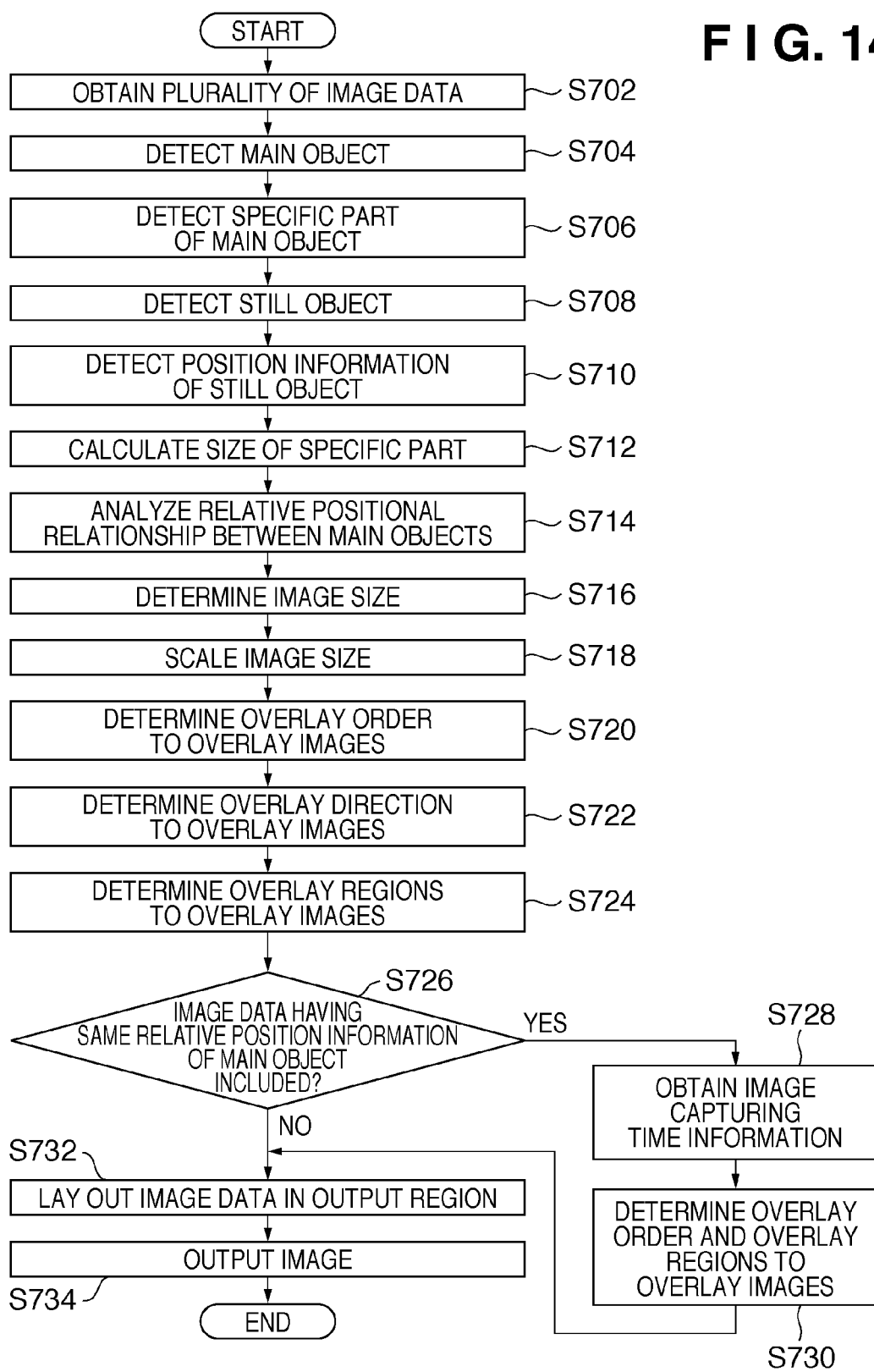
FIG. 14 is a flowchart for explaining layout processing according to the fourth embodiment.

FIG. 14 is a flowchart for explaining layout processing according to the fourth embodiment. Processes in steps S702 to S724 are the same as in steps S602 to S624 of the third embodiment, and a detailed description thereof will not be repeated here.

In step S726, the image processing apparatus determines whether the plurality of image data obtained in step S702 include image data having the same relative position information of the main objects. This determination can be done using the position information of the main object detected in step S704 and the position information of the specific part of the main object detected in step S706. If it is determined that the plurality of image data include image data having the same relative position information of the main objects, the process advances to step S728. If it is determined that the plurality of image data include no image data having the same relative position information of the main objects, the process advances to step S732.

In step S728, the image processing apparatus obtains the image capturing time information of each of the image data having the same relative position information of the main objects.

In step S730, the image processing apparatus determines the overlay order and the overlay regions of the image data having the same relative position information of the main objects based on the relative positional relationship between the main objects analyzed in step S714 and the image capturing time information obtained in step S728. More specifically, the overlay order and the overlay regions of the image data are determined such that image data whose image capturing time information is closes to the current time is overlaid on the upper side. Note that the determination of the overlay order and the overlay regions of the image data has been described in the second embodiment and the like, and a detailed description thereof will not be repeated here.

In step S732, the image processing apparatus lays out, in the output region, the image data scaled in step S718. More specifically, the image data are laid out in the output region based on the overlay order determined in step S720, the overlay direction determined in step S722, the overlay regions determined in step S724, and the overlay order and the overlay regions determined in step S730.

As described above, in the fourth embodiment, when obtained image data include image data having the same relative positional relationship between the main objects, the overlay order and the overlay regions of the image data in the output region are determined based on the image capturing time information of the image data. This makes it possible to prevent the image data having the same relative positional relationship between the main object from completely overlapping and determine a layout that expresses the relative positional relationship between the main objects.

Note that in this embodiment, the overlay order of image data having the same position information of the main objects is determined (controlled) in accordance with the image capturing time information. Without using the image capturing time information, the image data may be shifted not to make them completely overlap. In this case, it is possible to reduce the process load because the processing of determining the layout based on the image capturing time information is unnecessary.

In this embodiment, the overlay order of the images is determined based on the depth-direction relative positional relationship between the main object and the image capturing apparatus. However, if the main object continuously rotates at the same position, like a track race, it is sometimes preferable to give priority to the image capturing time information over the depth-direction relative positional relationship between the main object and the image capturing apparatus. Hence, the user preferably selects which has priority, the image capturing time information or the depth-direction relative positional relationship between the main object and the image capturing apparatus.

Fifth Embodiment

In the fifth embodiment, an example will be described in which when the main object becomes extremely small upon changing the image size, an ideal layout is determined by performing image processing such as trimming processing.

Figure 15:
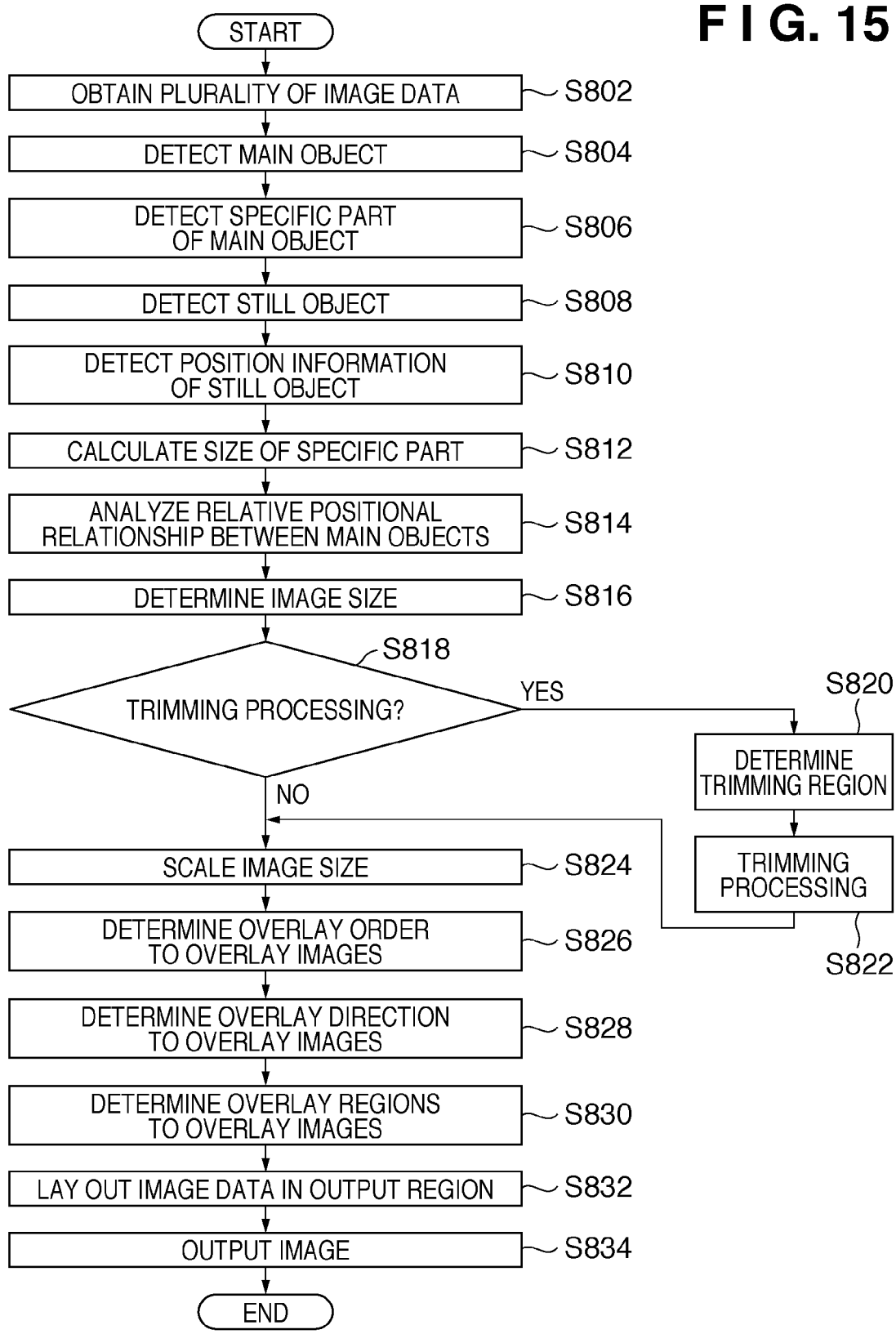
FIG. 15 is a flowchart for explaining layout processing according to the fifth embodiment.
Figure 16:
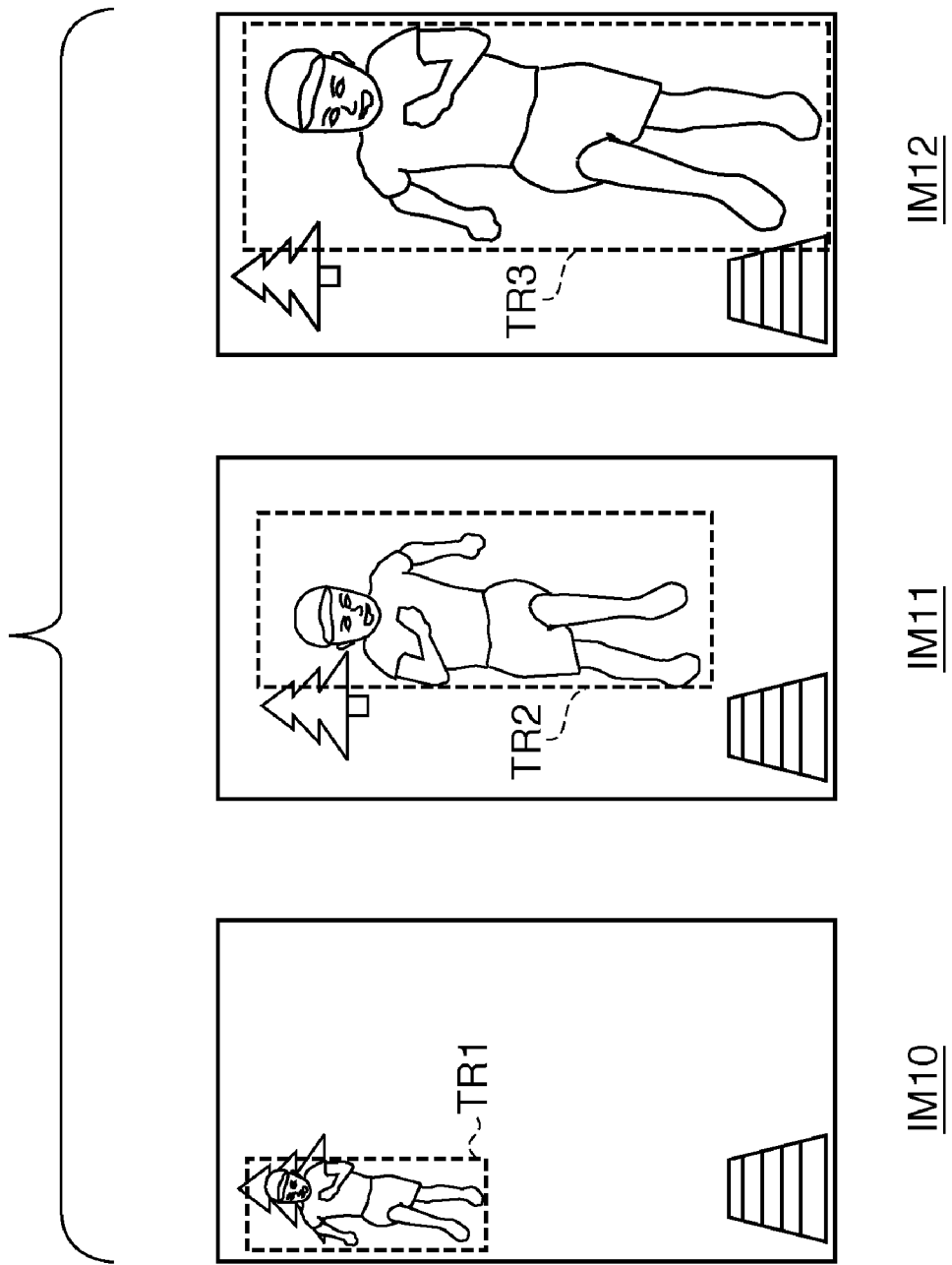
FIG. 16 is a view showing examples of images corresponding to a plurality of image data obtained in step S802 of FIG. 15.

FIG. 15 is a flowchart for explaining layout processing according to the fifth embodiment. Processes in steps S802 to S816 are the same as in steps S602 to S616 of the third embodiment, and a detailed description thereof will not be repeated here. In step S802, three image data (images IM10, IM11, and IM12) are obtained, as shown in FIG. 16. In this embodiment, an example in which three image data are obtained will be described. However, a plurality of image data in number other than three may be obtained, as a matter of course. FIG. 16 is a view showing examples of images corresponding to the plurality of image data obtained in step S802.

In step S818, the image processing apparatus determines based on the image sizes determined in step S816 whether to perform trimming processing for the image data. This determination can be done by causing the user to select whether to perform trimming processing using a UI (user interface) or by making an image processing apparatus 1 perform automatic determination. In the automatic determination, the image processing apparatus 1 determines to execute trimming processing if, for example, it is impossible to express the main object included in a reduced image because of the resolution of the printer or the monitor. If it is determined to perform trimming processing for the image data, the process advances to step S820. If it is determined not to perform trimming processing for the image data, the process advances to step S824.

In step S820, the image processing apparatus determines a region (trimming region) to perform trimming processing for each of the images corresponding to the plurality of image data obtained in step S802. More specifically, trimming regions TA1, TA2, and TA3 each including a person as the main object are determined for the images IM10, IM11, and IM12, respectively, as shown in FIG. 16.

Note that in this embodiment, a rectangular region that surrounds the whole person as the main object is determined as a trimming region. However, the present invention is not limited to this. For example, a region that surrounds a specific part such as the person's face may be determined as the trimming region.

In step S822, trimming processing is performed for the trimming region determined in step S820.

Processes in steps S824 to S834 are the same as in steps S618 to S628 of the third embodiment, and a detailed description thereof will not be repeated here.

Figure 17:
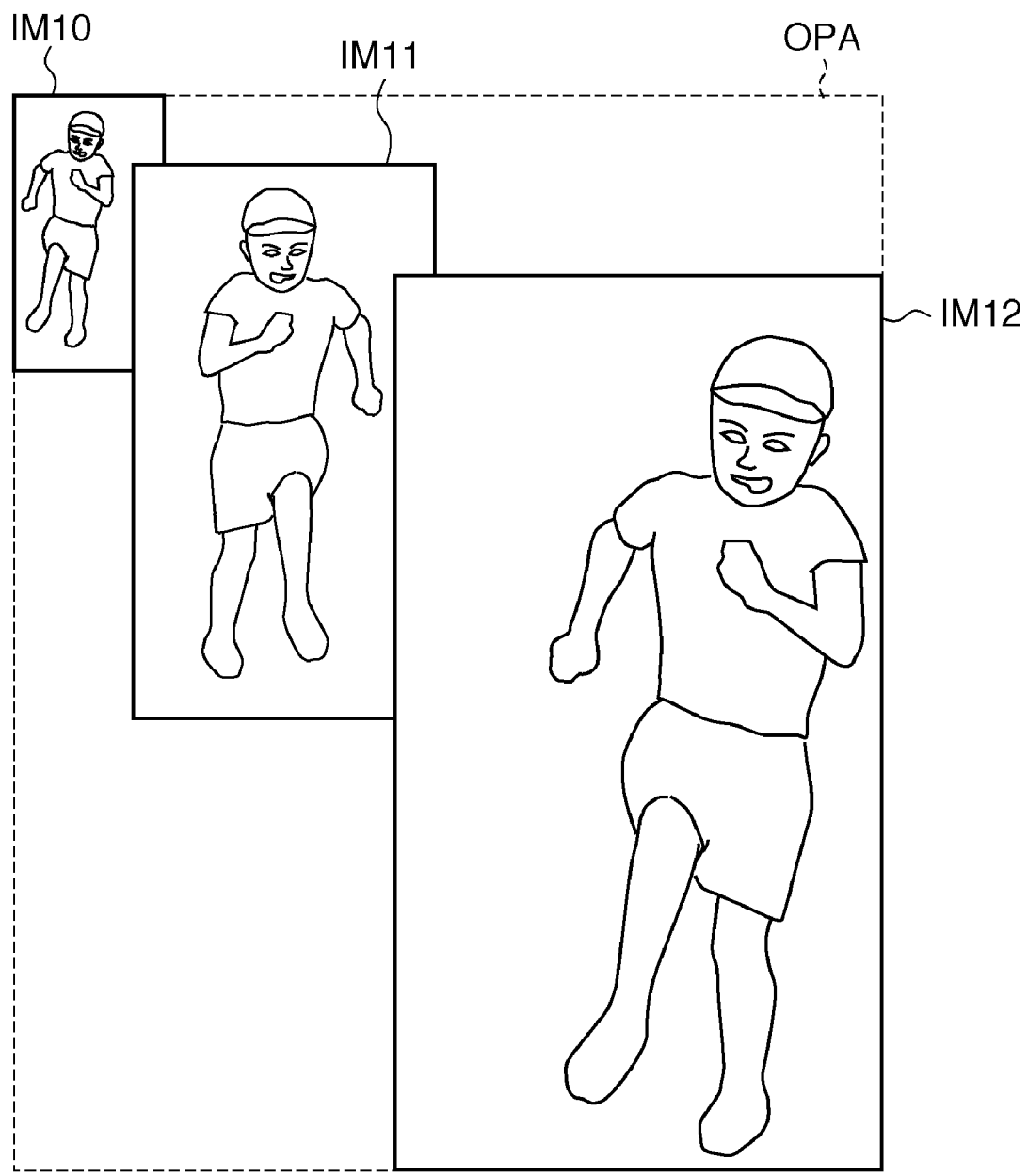
FIG. 17 is a view showing an example in which three trimmed images are laid out in an output region in step S832 of FIG. 15.

FIG. 17 is a view showing an example in which the three trimmed images IM10, IM11, and IM12 are laid out in an output region OPA in step S832. Referring to FIG. 17, it is possible to prevent the main object from becoming small by performing trimming processing for each trimming region surrounding the person in each of the images IM10, IM11, and IM12.

As described above, in the fifth embodiment, trimming processing is added to the layout processing, thereby changing the image size and the main object size at different ratios. This makes it possible to determine a layout that expresses the depth-direction relative positional relationship between the main object and the image capturing apparatus while preventing the main object size from becoming small. In other words, it is possible to determine an ideal layout that expresses the relative positional relationship between the main objects when laying out the plurality of image data (images) in the output region.

It is also possible to place emphasis on the relative positional relationship between the main objects when determining the trimming region. More specifically, trimming processing is performed for a larger trimming region in image data having a closer depth-direction relative positional relationship between the main object and the image capturing apparatus.

Image processing to be performed for the image data may be processing of blurring the image. When performing processing of blurring the image as the image processing, the blurring level is set lower for image data having a closer depth-direction relative positional relationship between the main object and the image capturing apparatus and higher for image data having a farther depth-direction relative positional relationship between the main object and the image capturing apparatus. This allows placing emphasis on the depth-direction relative positional relationship between the main object and the image capturing apparatus by using a characteristic that causes the user to feel a blurred image to be distant from the image capturing apparatus.

Image processing to be performed for the image data may be sharpness change processing. When performing sharpness change processing as the image processing, the sharpness is increased for image data having a closer depth-direction relative positional relationship between the main object and the image capturing apparatus and decreased for image data having a farther depth-direction relative positional relationship between the main object and the image capturing apparatus. This allows placing emphasis on the depth-direction relative positional relationship between the main object and the image capturing apparatus.

Image processing to be performed for the image data may be chroma change processing. When performing chroma change processing as the image processing, the chroma is increased for image data having a closer depth-direction relative positional relationship between the main object and the image capturing apparatus and decreased for image data having a farther depth-direction relative positional relationship between the main object and the image capturing apparatus. This allows placing emphasis on the depth-direction relative positional relationship between the main object and the image capturing apparatus by using a characteristic that causes the user to feel a discolored image to be distant from the image capturing apparatus.

In the present invention, the layout processing is executed based on the relative positional relationship between the main object and the image capturing apparatus. However, the layout processing may be performed based on the absolute positional relationship.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2008-246601 filed on Sep. 25, 2008, which is hereby incorporated by reference herein in its entirety.

What is claimed is:

1. An image processing apparatus for editing layout positions of a plurality of image data and laying out the plurality of image data, comprising:
    an image data obtaining unit configured to obtain a plurality of image data captured by an image capturing apparatus;
    a designation unit configured to designate an image group as an editing target in the plurality of image data obtained by said image data obtaining unit;
    a determination unit configured to determine a main object in each image data of the image group;
    a first positional relationship determination unit configured to calculate a size of the main object, determined by said determination unit, in each image data of the image group, and determine a depth-direction relative positional relationship between the main object in each image data of the image group and the image capturing apparatus by comparing the calculated sizes of the main objects of the image group; and a layout determination unit configured to determine, based on the depth-direction positional relationship determined by said first positional relationship determination unit, a layout order and image sizes or an image overlay order of the image data of the image group on the layout plane and lay out the image data of the image group on the layout plane.

2. The apparatus according to claim 1, wherein said layout determination unit determines the image overlay order to lay out image data having a closer depth-direction relative positional relationship between the main object and the image capturing apparatus on an upper side.

3. The apparatus according to claim 1, wherein said layout determination unit determines the image sizes to cause image data having a closer depth-direction relative positional relationship between the main object and the image capturing apparatus to have a larger image size.

4. The apparatus according to claim 1, further comprising:
a second positional relationship determination unit configured to calculate a position, in image data, of the main object determined by said determination unit, and determine a vertical or horizontal relative position relationship between the main objects in image data of the image group by comparing the calculated positions of the main objects of the image group,
wherein said layout determination unit determines a layout of the image data on the layout plane based on the positional relationship determined by said first positional relationship determination unit and the positional relationship determined by said second positional relationship determination unit.

5. The apparatus according to claim 4, wherein said layout determination unit determines the layout of the image data so as to maintain the positional relationship determined by said second positional relationship determination unit.

6. The apparatus according to claim 1, wherein said layout determination unit determines a layout of the image data on the layout plane by further performing image processing for the plurality of image data obtained by said image data obtaining unit.

7. The apparatus according to claim 6, wherein the image processing includes at least one of trimming processing, chroma change processing, and sharpness change processing.

8. The apparatus according to claim 7, wherein said layout determination unit executes at least one of image processing of performing trimming processing for a region larger relative to the main object, image processing of increasing chroma, and image processing of increasing sharpness in image data having a closer depth-direction relative positional relationship between the main object and the image capturing apparatus.

9. The apparatus according to claim 1, wherein said designation unit designates, as the image group, a plurality of image data designated by a user, a plurality of image data continuously taken in a continuous shooting mode, image data captured at close image capturing times, image data having similar compositions, or image data having close position information upon image capturing.

10. A method of controlling an image processing apparatus for editing layout positions of a plurality of image data and laying out the plurality of image data, comprising the steps of:
obtaining the plurality of image data captured by an image capturing apparatus;
designating an image group as an editing target in the plurality of image data obtained in the step of obtaining the plurality of image data;
determining a main object in each image data of the image group;
calculating a size of the main object, determined in said step of determining the main object, in each image data of the image group;
determining a depth-direction relative positional relationship between the main object in each image data of the image group and the image capturing apparatus by comparing the calculated sizes of the main objects of the image group; and
determining, based on the positional relationship determined in the step of determining the depth-direction relative positional relationship, a layout order and image sizes or an image overlay order of the image data of the image group on the layout plane and laying out the image data of the image group on the layout plane.

11. A non-transitory computer-readable storage medium storing a program which causes a computer to execute an image processing method of editing layout positions of a plurality of image data and laying out the plurality of image data, the program causing the computer to execute the steps of:
obtaining the plurality of image data captured by an image capturing apparatus;
designating an image group as an editing target in the plurality of image data obtained in the step of obtaining the plurality of image data;
determining a main object in each image data of the image group;
calculating a size of the main object, determined in said step of determining the main object, in each image data of the image group,
determining a depth-direction relative positional relationship between the main object in each image data of the image group and the image capturing apparatus by comparing the calculated sizes of the main objects of the image group; and
determining, based on the positional relationship determined in the step of determining the depth-direction relative positional relationship, a layout order and image sizes or an image overlay order of the image data of the image group on the layout plane and laying out the image data of the image group on the layout plane.

* * * * *